(12) United States Patent
Ionel

(10) Patent No.: US 8,102,091 B2
(45) Date of Patent: Jan. 24, 2012

(54) INTERIOR PERMANENT MAGNET MOTOR INCLUDING ROTOR WITH UNEQUAL POLES

(75) Inventor: Dan M. Ionel, Fox Point, WI (US)

(73) Assignee: Regal Beloit EPC Inc., Beloit, WI (US)

( * ) Notice: Subject to any disclaimer, the term of this patent is extended or adjusted under 35 U.S.C. 154(b) by 134 days.

(21) Appl. No.: 12/512,890

(22) Filed: Jul. 30, 2009

(65) Prior Publication Data

US 2010/0026128 A1    Feb. 4, 2010

Related U.S. Application Data

(60) Provisional application No. 61/085,950, filed on Aug. 4, 2008, provisional application No. 61/084,887, filed on Jul. 30, 2008.

(51) Int. Cl.
H02K 1/27    (2006.01)
(52) U.S. Cl. .............................. 310/156.53; 310/156.57
(58) Field of Classification Search ............ 310/156.53–156.57, 216.004, 216.011–216.012, 216.074
See application file for complete search history.

(56) References Cited

U.S. PATENT DOCUMENTS

| | | | |
|---|---|---|---|
| 2,643,350 A | 6/1953 | Merrill | |
| 2,927,229 A | 3/1960 | Merrill | |
| 3,157,809 A | 11/1964 | Bekey | |
| 3,492,520 A | 1/1970 | Yates | |
| 4,139,790 A | 2/1979 | Steen | |
| 4,324,996 A | 4/1982 | Adelski et al. | |
| 4,476,408 A | 10/1984 | Honsinger | |
| 4,486,678 A | 12/1984 | Olson | |
| 4,568,846 A | 2/1986 | Kapadia | |
| 4,658,165 A | 4/1987 | Vanderschaeghe | |
| 4,672,253 A | 6/1987 | Tajima et al. | |
| 4,713,569 A | 12/1987 | Schwartz | |
| 4,742,258 A | 5/1988 | Earle et al. | |
| 4,769,567 A | 9/1988 | Kurauchi et al. | |
| 4,795,936 A | 1/1989 | Crosetto et al. | |
| 4,841,186 A | 6/1989 | Feigel et al. | |
| 4,922,152 A | 5/1990 | Gleghorn et al. | |
| 4,968,913 A | 11/1990 | Sakamoto | |
| 5,097,166 A | 3/1992 | Mikulic | |
| 5,107,159 A | 4/1992 | Kordik | |

(Continued)

FOREIGN PATENT DOCUMENTS

EP    1973217 A2    9/2008
(Continued)

OTHER PUBLICATIONS

Finite Element Analysis of Brushless DC Motors for Flux Weakening Operation, Dan M. Ionel et al., Research Institute for Electrical Machines, University of Bath, Sep. 5, 1996.

(Continued)

*Primary Examiner* — Tran Nguyen
(74) *Attorney, Agent, or Firm* — Michael Best & Friedrich LLP

(57) ABSTRACT

An electric machine includes a stator and a rotor core including a first rotor portion positioned adjacent the stator and having an outside diameter. The first rotor portion includes a plurality of elongated slots that define a plurality of poles. The electric machine also includes a plurality of magnets. Each of the plurality of magnets is positioned within one of the slots and arranged such that each of the plurality of poles has a magnetic arc length that is different than a magnetic arc length of any adjacent pole.

21 Claims, 20 Drawing Sheets

U.S. PATENT DOCUMENTS

| | | | |
|---|---|---|---|
| 5,250,867 A | 10/1993 | Gizaw | |
| 5,369,325 A | 11/1994 | Nagate et al. | |
| 5,672,926 A | 9/1997 | Brandes et al. | |
| 5,731,647 A | 3/1998 | Schuller et al. | |
| 5,886,440 A | 3/1999 | Hasebe et al. | |
| 6,008,559 A | 12/1999 | Asano et al. | |
| 6,121,706 A | 9/2000 | Nashiki et al. | |
| 6,218,753 B1 | 4/2001 | Asano et al. | |
| 6,329,734 B1 | 12/2001 | Takahashi et al. | |
| 6,340,857 B2 | 1/2002 | Nishiyama et al. | |
| 6,353,275 B1 | 3/2002 | Nishiyama et al. | |
| 6,486,581 B2 | 11/2002 | Miyashita et al. | |
| 6,525,442 B2 | 2/2003 | Koharagi et al. | |
| 6,664,688 B2 | 12/2003 | Naito et al. | |
| 6,700,270 B2 | 3/2004 | Yanashima et al. | |
| 6,703,743 B2 | 3/2004 | Kaneko et al. | |
| 6,717,314 B2 | 4/2004 | Horst et al. | |
| 6,727,623 B2 | 4/2004 | Horst et al. | |
| 6,727,627 B1 | 4/2004 | Sasaki et al. | |
| 6,734,592 B2 | 5/2004 | Tajima et al. | |
| 6,737,783 B2 | 5/2004 | Yanashima et al. | |
| 6,791,223 B2 | 9/2004 | Suzuki et al. | |
| 6,794,784 B2 | 9/2004 | Takahashi et al. | |
| 6,844,652 B1 | 1/2005 | Chu et al. | |
| 6,849,981 B2 | 2/2005 | Kojima et al. | |
| 6,876,117 B2 | 4/2005 | Tajima et al. | |
| 6,876,119 B2 | 4/2005 | Sasaki et al. | |
| 6,891,300 B2 | 5/2005 | Noda et al. | |
| 6,917,133 B2 | 7/2005 | Koharagi et al. | |
| 6,946,766 B2 | 9/2005 | Gary et al. | |
| 6,987,341 B2 | 1/2006 | Chang et al. | |
| 7,038,345 B2 | 5/2006 | Fratta | |
| 7,095,149 B2 | 8/2006 | Hiruma et al. | |
| 7,095,152 B2 | 8/2006 | Weihrauch | |
| 7,102,263 B2 | 9/2006 | Takano et al. | |
| 7,105,971 B2 | 9/2006 | Asai et al. | |
| 7,109,624 B2 | 9/2006 | Yashiro et al. | |
| 7,183,685 B2 | 2/2007 | Weihrauch | |
| 7,183,686 B2 | 2/2007 | Sasaki et al. | |
| 7,233,090 B2 | 6/2007 | Evans et al. | |
| 7,282,827 B2 | 10/2007 | Futami | |
| 7,420,308 B2 | 9/2008 | Ramu et al. | |
| 2003/0071533 A1 | 4/2003 | Kikuchi et al. | |
| 2004/0245880 A1 | 12/2004 | Liang | |
| 2005/0269888 A1 | 12/2005 | Utka | |
| 2006/0028082 A1 | 2/2006 | Asagara et al. | |
| 2007/0132330 A1 | 6/2007 | Fei et al. | |
| 2007/0138893 A1 | 6/2007 | Son | |
| 2007/0138894 A1 | 6/2007 | Shin | |
| 2007/0145851 A1 | 6/2007 | Kikuchi et al. | |
| 2007/0152527 A1 | 7/2007 | Yura et al. | |
| 2007/0222326 A1 | 9/2007 | Ionel et al. | |
| 2007/0228861 A1 | 10/2007 | Kinoshita | |
| 2007/0252467 A1 | 11/2007 | Hoemann et al. | |
| 2007/0257576 A1 | 11/2007 | Adaniya et al. | |

FOREIGN PATENT DOCUMENTS

| | | |
|---|---|---|
| JP | 11098736 A | 4/1999 |
| JP | 11243653 A | 9/1999 |
| JP | 2001231196 A | 8/2001 |
| KR | 1019990065127 A1 | 8/1999 |
| WO | 2004075378 A1 | 9/2004 |

OTHER PUBLICATIONS

Finite Element Analysis of an Interior-Magnet Brushless D.C. Machine, with a Step=Skewed Rotor, Eastham et al., University of Bath, Mar. 2, 1997.

Design Considerations for Permanent Magnet Synchronous Motors for Flux Weakening Applications, Ionel et al., May 1, 1998.

Pending U.S. Appl. No. 12/114,460, filed May 2, 2008.

INTERIOR PERMANENT MAGNET MOTOR INCLUDING ROTOR WITH UNEQUAL POLES

RELATED APPLICATION DATA

This application claims benefit under 35 U.S.C. Section 119(e) of co-pending U.S. Provisional Application No. 61/084,887, filed Jul. 30, 2008, and co-pending U.S. Provisional Application No. 61/085,950, filed Aug. 4, 2008, both of which are fully incorporated herein by reference.

BACKGROUND

The invention relates to permanent magnet brushless motors that include a rotor that has interior permanent magnets. More particularly, the present invention relates to motor rotors that include interior permanent magnets and unequal poles.

Conventional permanent magnet brushless motors with interior permanent magnet (IPM) rotors have a non-sinusoidal distribution of the air-gap magnetic field. This non-sinusoidal distribution can lead to a non-sinusoidal back emf waveform, which can be detrimental to motor electronic control and can cause increased torque ripple, noise, and vibration. Furthermore, the repetitive structure of the poles (i.e., alternating North and South polarity poles having the same geometry) can cause an increase in the cogging torque.

SUMMARY

The present invention provides a rotor for a motor that includes a plurality of pole pieces. Each pole piece defines a pole arc length and an active arc length different from the pole arc length. A portion of the plurality of pole pieces has a first pole arc length and a portion of the remaining pole pieces have a second pole arc length different from the first pole arc length.

In one construction, the invention provides an electric machine that includes a stator and a rotor core including a first rotor portion positioned adjacent the stator and having an outside diameter. The first rotor portion includes a plurality of elongated slots that define a plurality of poles. The electric machine also includes a plurality of magnets. Each of the plurality of magnets is positioned within one of the slots and arranged such that each of the plurality of poles has a magnetic arc length that is different than a magnetic arc length of any adjacent pole.

In another construction, the invention provides an electric machine that includes a stator and a first rotor portion positioned adjacent the stator and having an outside diameter. The first rotor portion includes a first number of slots formed proximate the outside diameter to define a first number of pole pieces. Each slot includes a first end region and a second end region that cooperates with the respective slot to define a pole pitch. The pole pitch of any one of the pole pieces is different from the pole pitch of at least one pole piece adjacent the one selected pole piece. A second rotor portion is substantially the same as the first rotor portion and includes a first number of pole pieces. The second rotor portion is stacked axially adjacent the first rotor portion such that at least one of the pole pieces of the second rotor portion has a different pole pitch than the adjacent pole piece of the first rotor portion. The electric machine also includes a plurality of magnets. Each magnet is positioned within one of the slots.

In yet another construction, the invention provides an electric machine that includes a stator and a rotor. The rotor includes a first rotor portion positioned adjacent the stator and having an outside diameter. The first rotor portion includes a plurality of V-shaped slots having two legs formed such that an apex of the V-shaped slot is positioned further from the outside diameter than the remainder of the V-shaped slot, a first end region, and a second end region. The slots and end regions cooperate to define a plurality of openings each having a shape. Each V-shape slot defines a pole piece. The electric machine also includes a plurality of magnets. Each of the plurality of magnets is positioned within one of the legs of the slots.

BRIEF DESCRIPTION OF THE DRAWINGS

FIG. 3a is an end view of the rotor core of FIG. 3;

DETAILED DESCRIPTION

Figure 1:
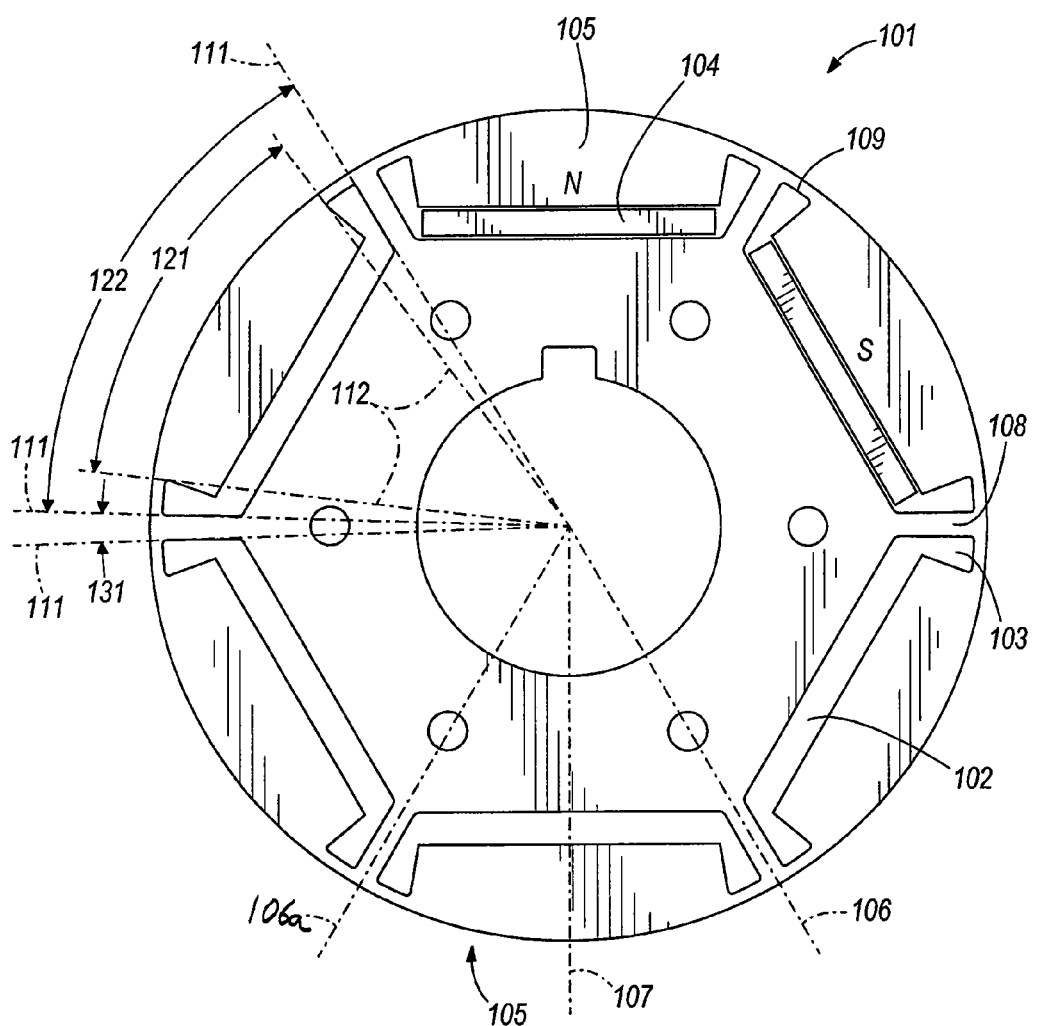
FIG. 1 is an end view of a rotor core of the IPM (interior permanent magnet) type.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

One typical rotor construction for permanent magnet synchronous motors (also known as brushless permanent magnet motors) consists of a substantially cylindrical core of ferromagnetic material, such as laminated steel, with arc magnets attached to the surface facing the motor air-gap and the stator. From a magnetic point of view, such a motor is substantially non-salient, the values of the d and q axis inductances being approximately the same. When driven by an electronic controller, a motor of this construction is preferably operated so that the phasor of the stator current is aligned with the q axis in order to deliver maximum torque per ampere.

Other typical rotor constructions, known to those skilled in the art, are of the interior type, where the magnets are inserted within the rotor core and magnetized substantially radially, in a configuration typically denoted as IPM (interior permanent magnet), or magnetized substantially tangentially in a configuration typically referred to as "spoke", because of the resemblance of the magnets position with the spokes of a wheel. From a magnetic point of view, such a motor is substantially salient as the value of the unsaturated q-axis inductance is larger than the value of the d-axis inductance. When driven by an electronic controller, a motor of this construction is preferably operated so that the phasor of the stator current has, in addition to the q-axis current component, a demagnetizing d-axis component in order to take advantage of the reluctance torque and further improve the torque output. However, it is known that the saturation of the q-axis armature flux path, which tends to be rather high in conventional IPM motors, reduces the q-axis inductance and the reluctance torque.

Both the IPM and the SPM motor typically employ a stator with a core built of ferromagnetic material, such as laminated electric steel (cold rolled electric motor steel), or a powdered metal core, and a winding that can be of the distributed or the concentrated type. The stators that are employed in conjunction with the IPM and the SPM rotor, respectively, can be different, e.g. can have different dimensions, number of slots, grade of steel etc. Typically, a relative axial skew is provided between the stator and the rotor. In the SPM motor the magnets or the magnetization are skewed, while for the IPM motor the stator core can be skewed.

Figure 13:
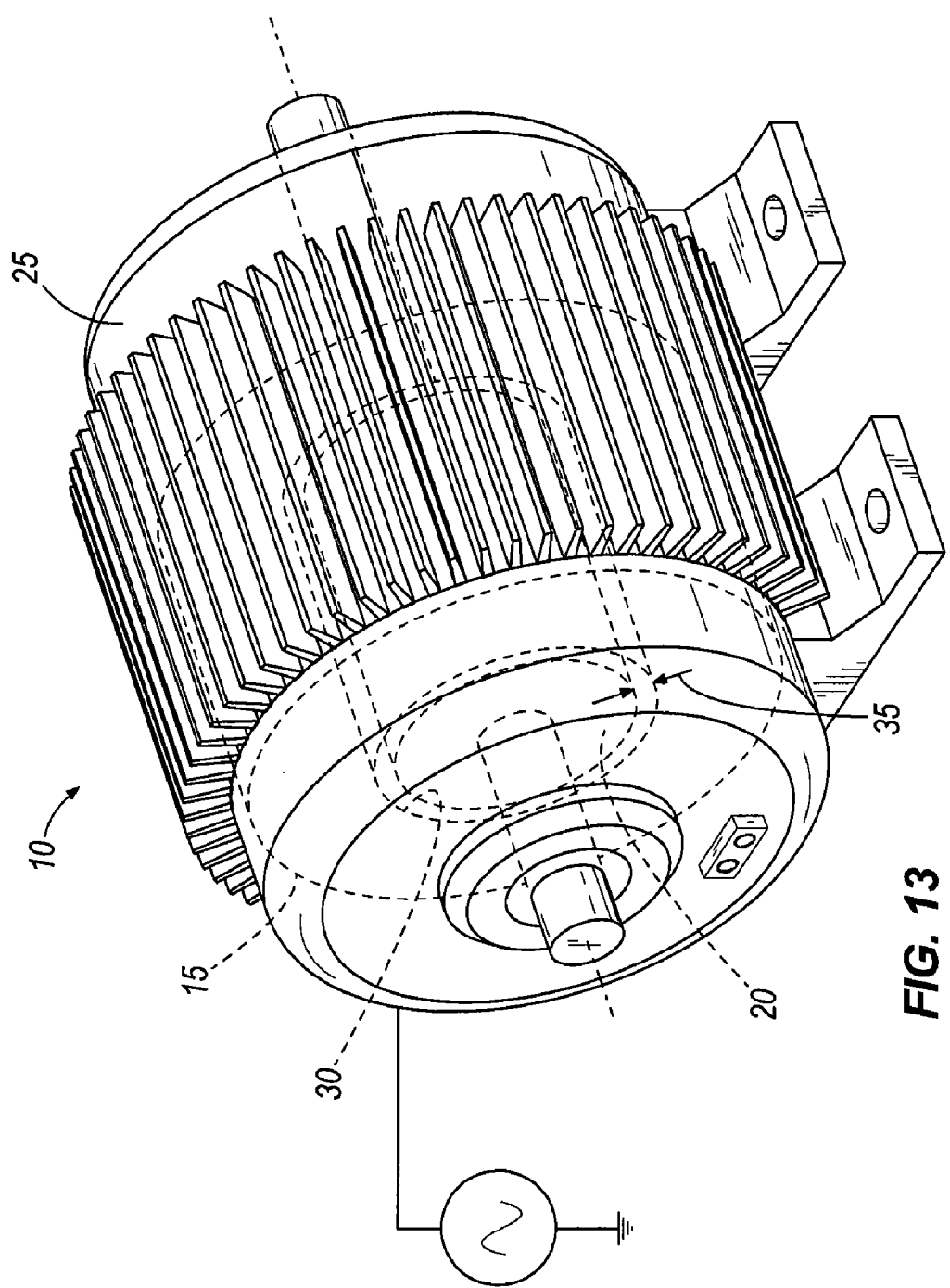
FIG. 13 is a perspective view of a motor incorporating any of the rotor cores illustrated herein.

FIG. 13 illustrates a motor 10 that includes a stator 15 and a rotor 20. The stator 15 is supported within a housing 25 and defines a rotor opening 30 sized to receive the rotor 20 and define a desired air gap 35 therebetween. The rotor 20 includes a core that supports permanent magnets configured to induce rotation of the rotor 20 in response to a flow of electrical current through the stator 15.

FIG. 1 is a cross-sectional view of a rotor core 101 made of laminated electric steel or from other ferromagnetic materials such as compressed iron powder or soft magnetic composites (SMC). In constructions that employ laminated electric steel, the laminations are stacked in a stackwise direction 33 to define one or more core portions. The core, or core portion, has slots 102 that include two ends or end portions 103.

Permanent magnets (PM) 104 are placed in the slots. Only two magnets are shown in the FIG. 1, but it is understood that the number and dimensions of the magnets can vary. Typically magnets of different polarities, North (N) and South (S), respectively are placed in two consecutive magnet slots 102. The core shown in FIG. 1 is suitable for use in a six pole interior permanent magnet (IPM) motor with more or fewer poles being possible depending on the motor design. It should be noted that the magnets 104 are shown as being artificially small when compared to the slot 102 for purposes of illustration. However, as one of ordinary skill will realize, the magnets 104 are generally sized to tightly fit within the slots 102 to inhibit unwanted movement of the magnets 104.

The ends 103 of a permanent magnet slot 102 and the rotor outer surface define an outer magnetic bridge 109. The end regions 103 of two adjacent permanent magnet slots 102 cooperate to define an inner magnetic bridge 108, sometimes referred to as an inter-polar bridge. An axis 106 that goes through the rotor center and substantially through the middle of the inter-polar bridge 108 defines the demarcation between two consecutive rotor poles that may be of opposite N and S polarities and is defined as an inter-polar axis 106. Two consecutive inter-polar axes 106 define the bounds of a rotor pole piece 105. A line that goes through the rotor center and substantially through the middle of a pole piece 105 defines a center pole axis 107.

With respect to FIG. 1 the arc pole length (pitch) is measured on the rotor outer surface between two consecutive inter-polar axes 106. Lines 111 and 112 extend through the center of the core and the two extreme points of the permanent magnet slot end region 103, respectively, as shown in FIG. 1. Two arcs are thus defined between adjacent lines 111 and 112 in any given pole. The first of these arcs, arc 121 extends between lines 112 and the second of these arcs, arc 122 extends between lines 111. The active (arc) pole length is defined as the average between the arcs 121 and 122. The arc length of inter-polar bridges 108 is defined as the smallest distance or angle between two adjacent lines 111.

While the previous definitions are based on geometry, it should be understood that definitions based on the magnetic field pattern are preferable. This is particularly important for example for rotors in which the inter-polar bridges do not entirely align with the radial direction, as it is the case for the 4-pole rotor shown in FIG. 19. The magnetic definitions are introduced with reference to FIG. 20, which exemplifies the radial component of the magnetic flux density in the air-gap of a motor incorporating a rotor of the type shown in FIG. 1. For the purpose of the definitions, the electric machine is considered operating with the stator windings in open-circuit, i.e. with no current flowing through the conductors. The curve shown in FIG. 20 was obtained through electromagnetic finite element analysis and includes the depressions (ripple) cause by the stator slots. In the example there are 36 stator slots, i.e. 6 per pole. The field in the motor air-gap can also be measured using magnetic instrumentation as is known to those skilled in the art.

From a magnetic point of view, the inter-polar axis 106 is defined by the zero-crossing of the radial component of the magnetic flux density transitioning from a North (N) pole to an adjacent South (S) pole. The inter-polar axis 106a is defined by the zero-crossing of the radial component of the magnetic flux density transitioning from a N pole to an adjacent S pole. In this example the magnetic pole arc length (pitch) 2003 of the North pole is equal to 60 degrees and is equal to the magnetic pole arc length 2004 of the South pole. In other constructions, such as the one shown in FIG. 2 two adjacent poles may have different magnetic pole lengths.

From a magnetic point of view, the active pole length is influenced by the geometrical dimensions of the inter-polar 108 and outer magnetic bridges 109 and also by the electro-magnetic properties of the materials and by the motor on-load operating conditions that contribute to the magnetic saturation of the bridge and to the magnetic leakage flux through the bridges. Starting from the 0 degree position of FIG. 20 an axis 2010 is defined by the position at which the open-circuit normal component of air-gap flux density first exceeds 40% of the peak value of flux density 2020. An axis 2011 is defined by the position after which the air-gap flux density does no longer exceed 40% of the peak value of flux density 2020. The two axes 2010 and 2011 cooperate to define the active magnetic pole length 2012. Similar definitions can be introduced for the South pole shown in FIG. 20.

For a design with substantially thin inter-polar bridges 108 and substantially small end portions 103, the arc 122 is substantially equal to the pole pitch. In the example design shown in FIG. 1, the arcs 121, 122 and 131 are approximately 47, 57, and 3 degrees, respectively. The value of the active arc pole length is therefore equal to (47+57)/2 or 52 degrees. For this 6-pole example, the (overall) pole (arc) length of each pole is 60 degrees, i.e. 360 degrees divided by the number of poles, while the active arc pole length of each pole is 52 degrees.

The angles previously mentioned are geometrical or otherwise called mechanical degrees. For the study of electrical machines electrical degrees are also employed so that results can be generalized for different motor polarities. The electrical degrees are equal to the mechanical degrees times the number of pole pairs, i.e. the number of poles divided by two. For the example 6-pole design previously mentioned, the 52 mechanical degrees correspond to 156 electrical degrees.

Figure 2:
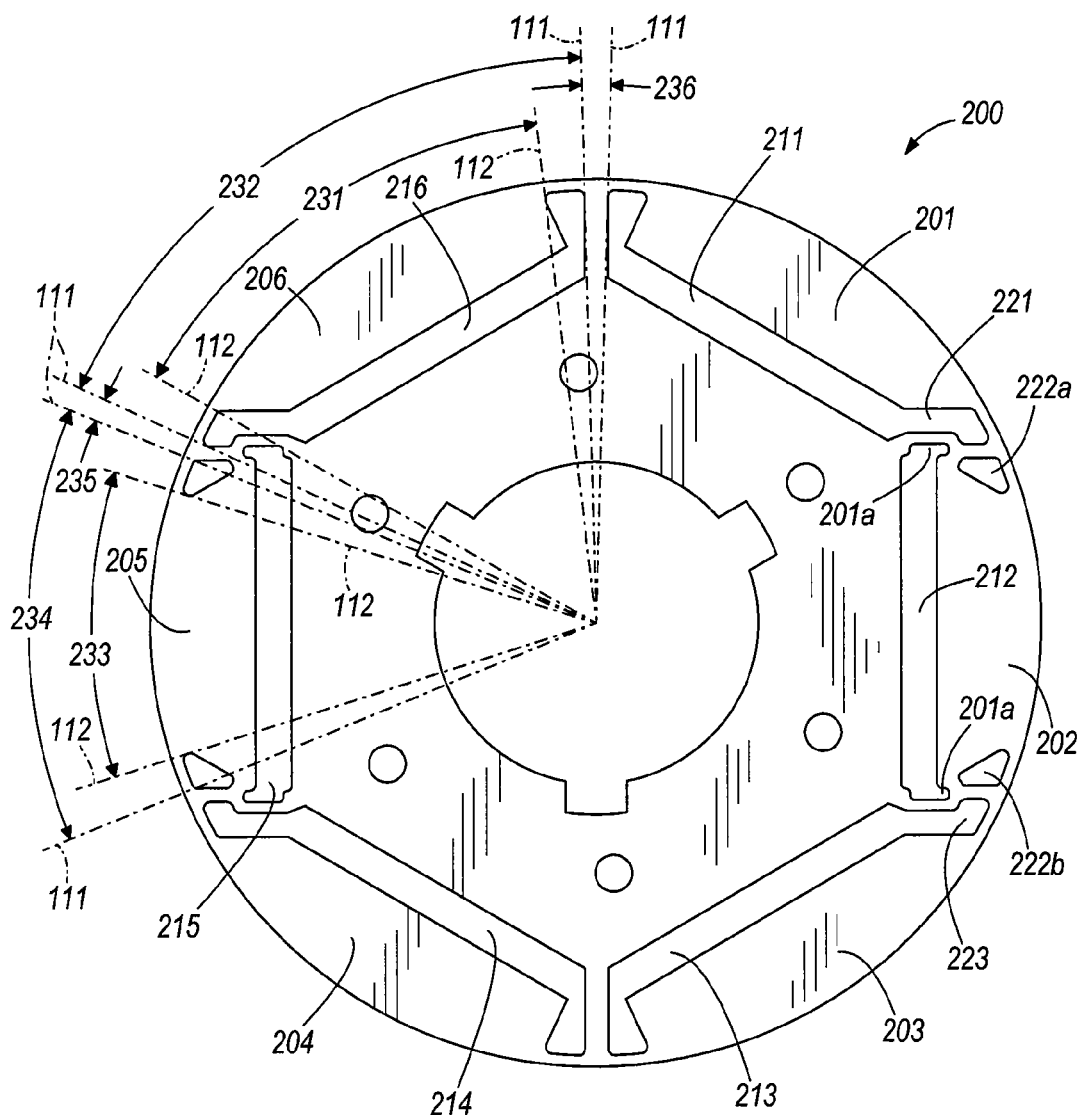
FIG. 2 is an end view of another rotor core of the IPM (interior permanent magnet) type with unequal poles.

FIG. 2 is an end view of a rotor core 200 according to one embodiment of the invention. In the construction of FIG. 2, the rotor core 200 includes six pole pieces 201-206 that have different geometry and different arc lengths. Opposite pole pieces 201 and 204, 202 and 205, 203 and 206, are symmetric with one another in order to improve motor performance by reducing the effect of radial forces and the unbalanced magnetic pull. In other words, the core 200 has symmetry of two quadrants (180 degrees) but has an asymmetry of one quadrant (90 deg). For example, the 1st quadrant (i.e. between 12 o'clock and 3 o'clock) is asymmetrical with the 2nd quadrant (i.e. 12 o'clock and 9 o'clock). On a more general basis, the configuration has an asymmetry of one and a half pole pieces. In other words, one quadrant of the geometry of the core 200 is a mirror image of the adjacent quadrants.

The rotor core 200 includes permanent magnet slots 211-216 that are similarly positioned and shaped as the magnet slots 104 of FIG. 1. However, the slot end regions of the slots 211-216 differ from the end regions 103 of FIG. 1. The geometry of poles 201 and 204 can be explained through geometrical morphism, starting from a pole piece 105 of FIG. 1 and "skewing" in a clockwise direction the slot end region 103 to substantially become the slot end region 221 of FIG. 2. The opposite slot end region 103 is substantially the same as the end regions 103 of FIG. 1.

The pole pieces 202 and 205 include a largely rectangular slot 212, 215 that include two small end portions 201a that extend radially outward and define a narrow end portion of the rectangular slot 212, 215. The narrow portions provide stops that inhibit unwanted movement of the magnets. Two apertures 222a and 222b are positioned adjacent the small end portions 201a and are dimensioned and positioned in order to minimize the magnetic leakage flux and at the same time to enhance the mechanical strength of the rotor.

The geometry of pole pieces 203 and 206 can be explained through geometrical morphism starting from a pole piece 105 of FIG. 1 and by "skewing" in counter-clockwise direction the slot end 103 to substantially become the slot end 223 of FIG. 2. The opposite slot end 103 is substantially the same as the slot end 103 of FIG. 1.

The core 200 of FIG. 2 includes four long pole pieces 201, 203, 204, and 206 and two short pole pieces 202, 205. As illustrated with regard to the pole piece 206, the long pole pieces define two radial lines 111 that pass through the outermost points of the end portions and two radial lines 112 that pass through innermost points of the end portions. Thus, the long pole pieces each define a first arc 231 that extends between lines 112 and a second arc 232 that extends between lines 111.

With reference to pole piece 205, the short pole pieces each define two radial lines 111 that extend through the outermost point of aperture 222a and 222b respectively. Two additional radial lines 112 extend through the innermost point of aperture 222a and 222b respectively. Thus, the short pole pieces each define a first arc 233 that extends between lines 112 and a second arc 234 that extends between lines 111. A third arc 235 is defined between lines 111 of adjacent pole pieces 205, 206 and a fourth arc 236 is defined between lines 111 of adjacent pole pieces 201, 206.

In the preferred construction, the pole pitch of pole pieces 201, 203, 204, and 206 are equal to one another and are equal to an average pole arc of 60 degrees plus a pole skew angle. Consequently, the pole pitch of pole piece 202 is equal to 60 degrees minus 2 times the pole skew angle. As discussed with regard to FIG. 1, the active arc length of each pole piece is calculated as the average of the two arcs defined by the lines 111 and 112. Thus, the active arc length of the long pole pieces is equal to the average of arc 231 and arc 232. The active arc length of the short pole pieces is equal to the average of arc 233 and arc 234.

The optimal pole skew angle is defined by the rotor polarity, by the stator design (e.g., the number of slots and the winding design), and the optimization objective or criterion. For example, in order to reduce the stator slotting harmonics and the cogging torque, the pole skew angle is selected to be equal to a fraction of the stator slot pitch, such as one sixth or one third. If another optimization criterion is employed, such as the reduction of the harmonic content of the air-gap magnetic field or the reduction of a certain harmonic (e.g. the $5^{th}$ or the $7^{th}$ harmonic) another value of the pole skew angle may be selected.

The active arc pole length can also be varied, through the modification of the arcs 231, 232, 233 and 234, obtained through the dimensional design of ends 221, 223 and apertures 222a and 222b. Following the procedure explained with reference to FIG. 1, the arcs 231-236 are defined as shown in FIG. 2. In one possible construction, the arc lengths for the arcs 231, 232, 233 and 234 are approximately 53.3, 64.5, 33.5 and 45 degrees, respectively. The active pole arc length for pole pieces 201 and 203 is therefore approximately 58.9 degrees and for pole piece 202 is about 39.3 degrees. The average for all rotor pole pieces is 52.4 degrees. The arc bridges 235 and 236 have values of approximately 2 to 3 degrees.

Figure 20:
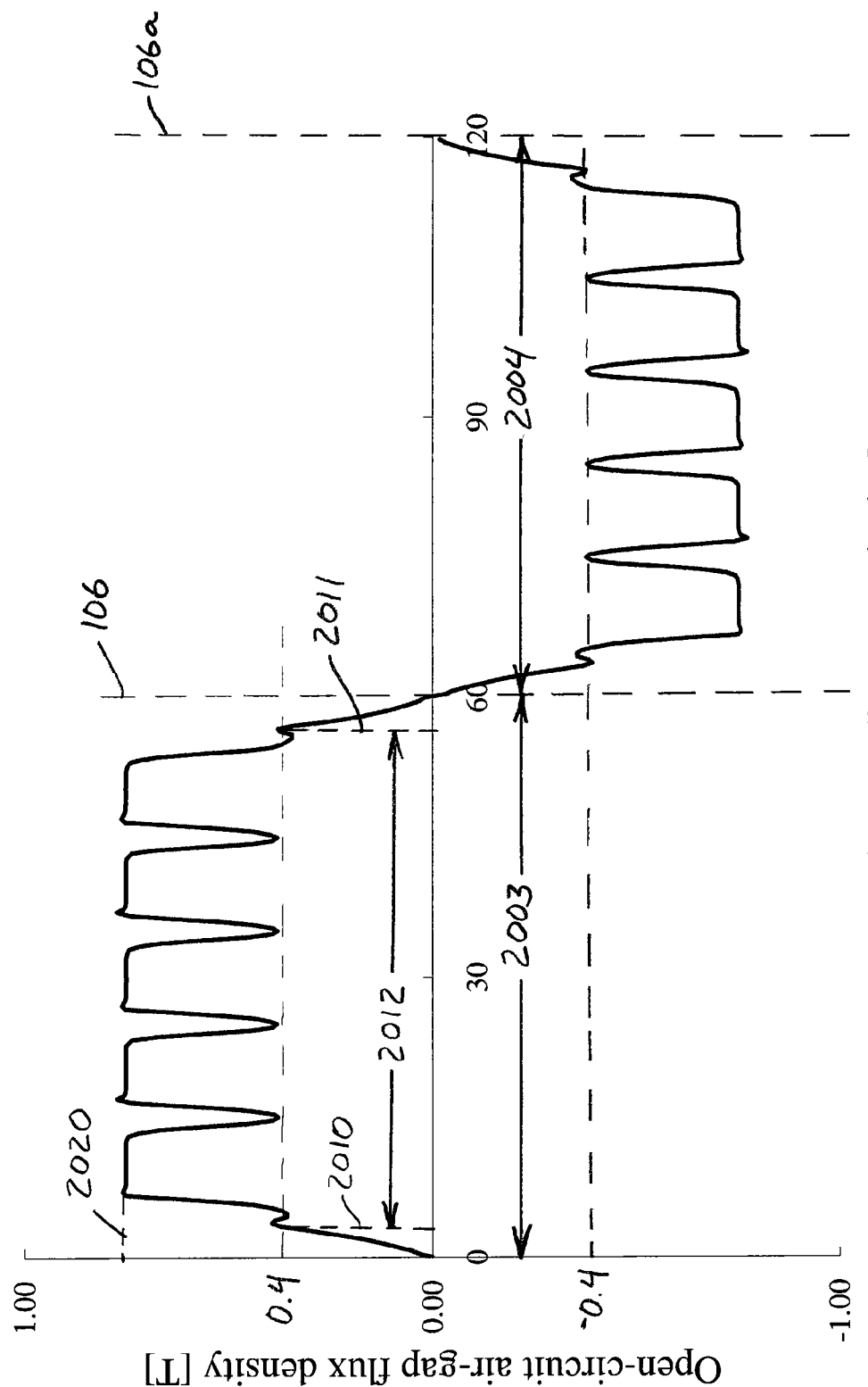
FIG. 20 is a graph of air-gap density versus angular coordinate.

While in the previous description of FIG. 2 geometric elements were used to define the pole arc and the active pole arc, it is understood that magnetic definitions can be introduced on a per-pole basis, following the procedure described with reference to FIG. 20. In this case, adjacent poles may have different magnetic arc lengths and different active pole arc lengths. The same holds true for other constructions described, such as for example the one shown in FIG. 9. One interesting aspect of the invention is that it can be applied to any machine having a number of poles that are integral multiples of four or six. In constructions with multiples of four, the sum of the magnetic pole lengths of any two adjacent poles is equal to about 360 electrical degrees with 360 being preferable. Similarly, in constructions with multiples of six poles, the sum of the magnetic pole lengths of any three adjacent poles is equal to about 540 electrical degrees with 540 being preferable. In general, a variation of greater than one degree from the preferable angle will degrade the performance of the machine and is not desirable.

Figure 3:
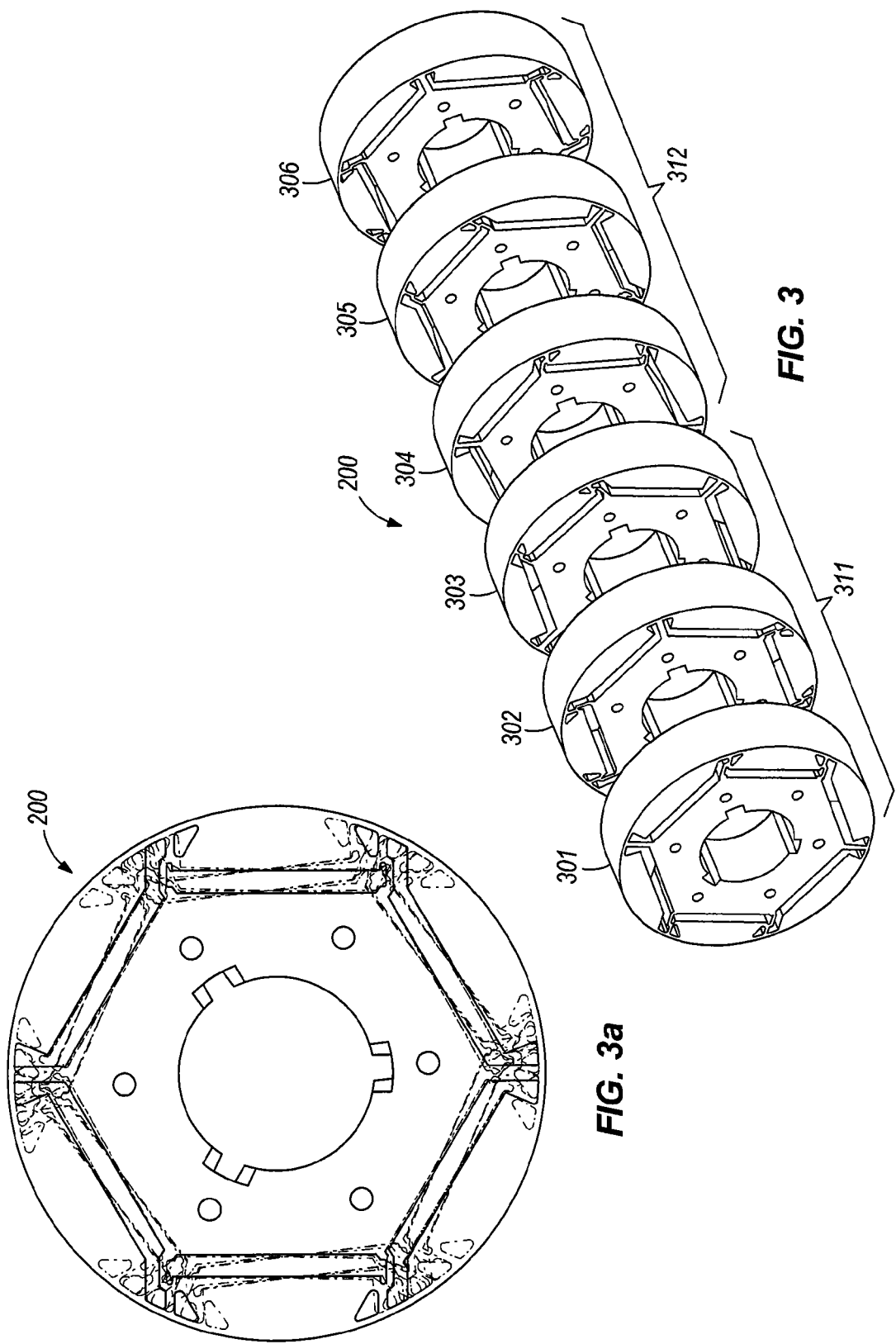
FIG. 3 is an exploded perspective view of a rotor core formed from a plurality of rotor portions.

In order to axially average or balance the effect of an asymmetric rotor core with different pole piece geometries on motor radial forces and unbalanced magnetic pull and on parameters such as the back emf waveform, the core 200 is preferably built of axial modules 301-306, as shown in FIG. 3. A first section 311 comprises three modules 301, 302, and 303 rotated by substantially 120 degrees or an integral multiple of 120 degrees with respect to the previous module so that the permanent magnet slots still substantially align axially, while the permanent magnet slot end regions and the inter-polar magnetic bridges do not necessarily align, as illustrated in FIG. 3a.

The second section 312, which includes modules 304, 305 and 306, is built similarly. In the preferred construction the axial modules 301-306 have the same axial length, which is a fraction of the total core length, i.e. a sixth in the example of FIG. 3. When mounted on the motor shaft (not shown) the two sections 311 and 312 are axially staggered, i.e. rotated with respect to each other, in order to further improve the sinusoidality of the back emf and inductance waveform and reduce cogging and ripple torque. As illustrated in FIGS. 3 and 3a, the two sections 311 and 312 are staggered by 10 degrees to improve the performance of a 3-phase motor equipped with a stator having nine slots and concentrated coils wound around each tooth.

Figure 4:
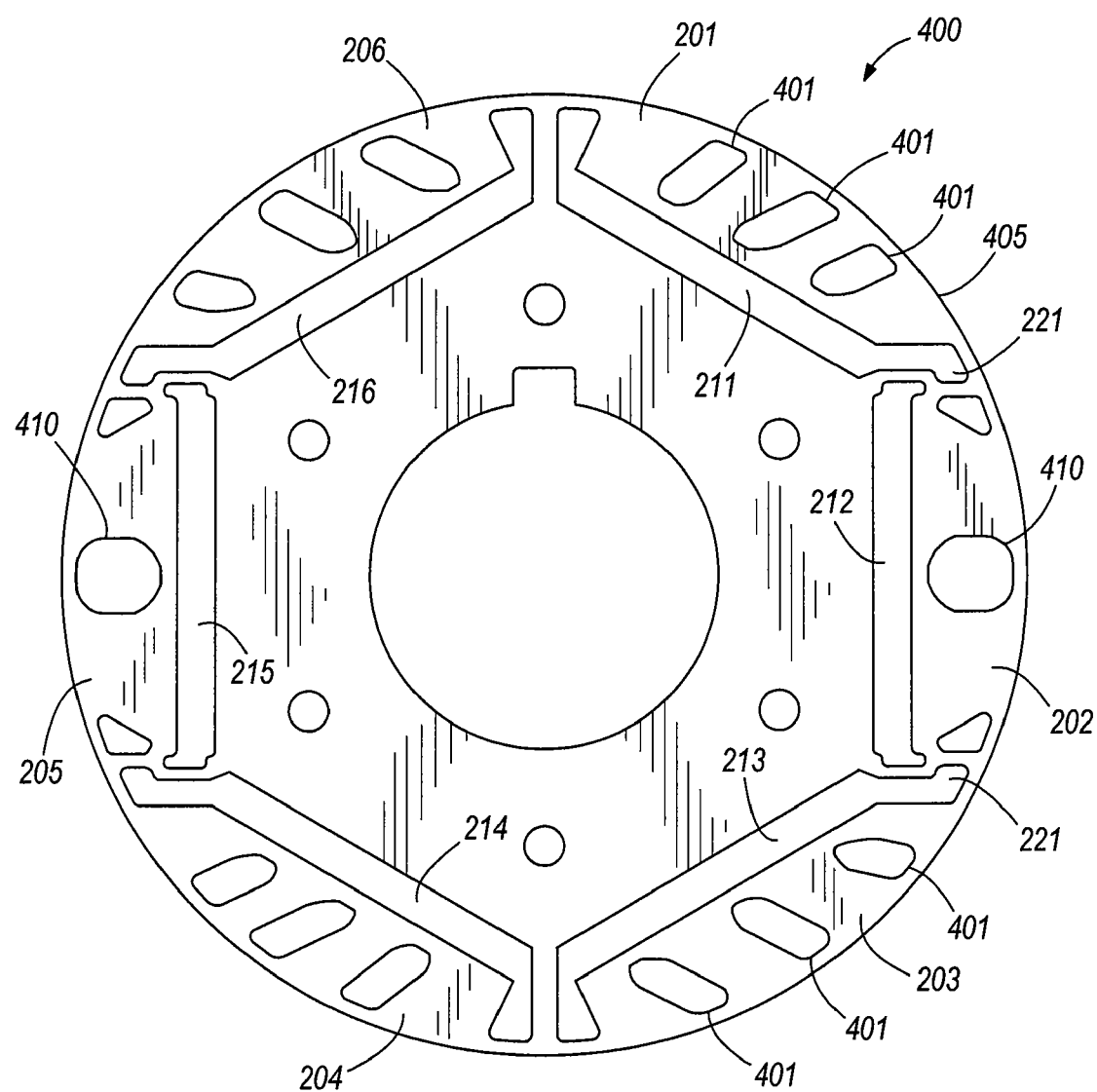
FIG. 4 is an end view of another rotor core of the IPM (interior permanent magnet) type with unequal poles.
Figure 5:
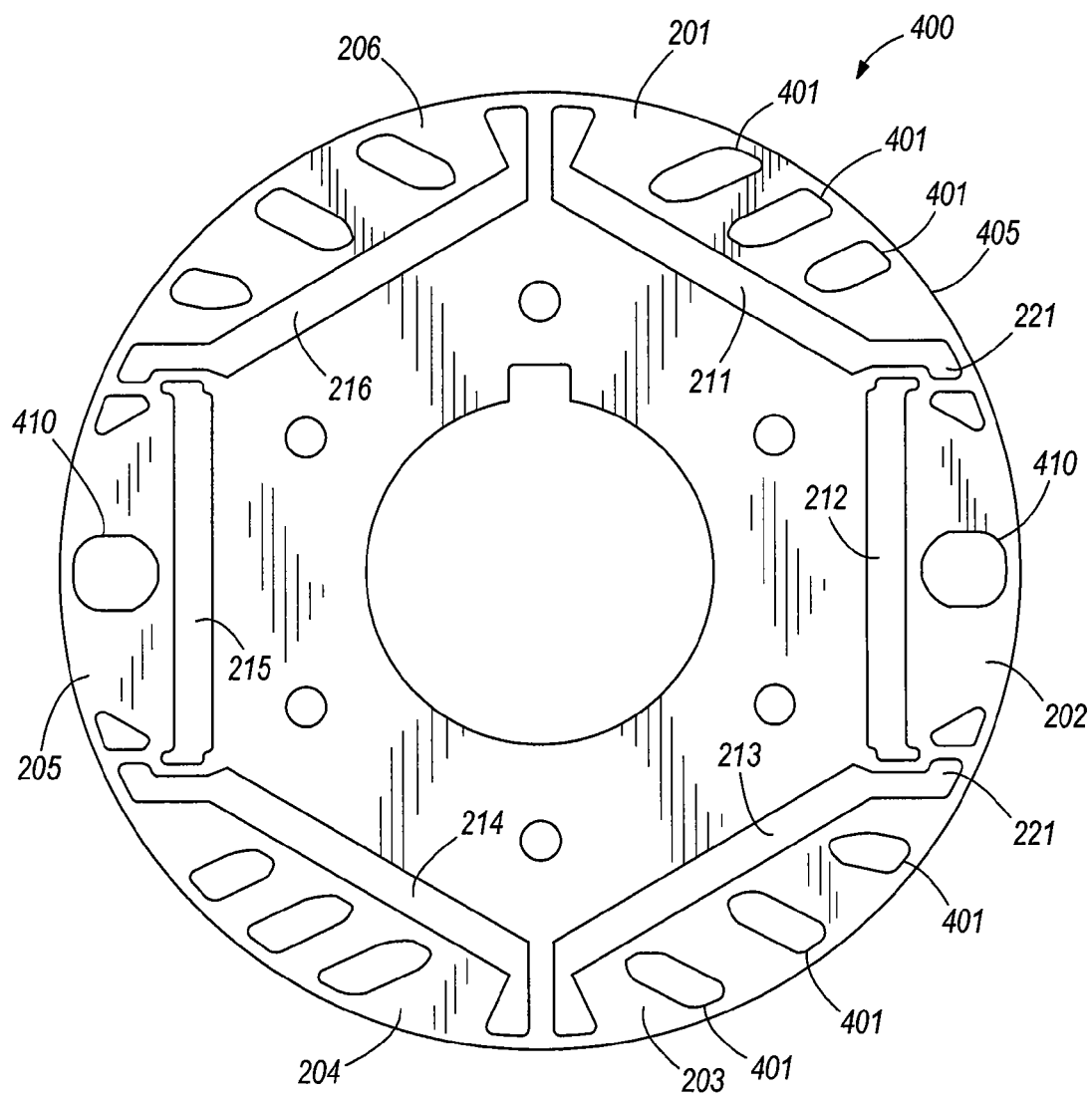
FIG. 5 is an end view of another rotor lamination of the IPM (interior permanent magnet) type with unequal poles and flux barriers.

To further enhance motor operation, the construction of FIG. 2 can be combined, as shown in FIGS. 4-5, with the concept of employing laminations 400 that include non-uniformly distributed flux barriers 401, i.e. apertures in the upper part of the pole pieces 201-206. U.S. patent application Ser. No. 12/050,087 filed Mar. 17, 2008 describes similar flux barriers and is hereby fully incorporated by reference. As illustrated in FIGS. 4 and 5, the long pole pieces 201, 203, 204, 206 each include three flux barriers 401. The flux barriers 401 are elongated apertures of differing lengths positioned between an outer surface 405 of the lamination 400 and the permanent magnet slots 211, 213, 214, 216. The apertures 401 are skewed in the direction of the skewed end portion 221 of each of the pole pieces 201, 203, 204, 206. Thus, the apertures 401 of pole pieces 201 and 204 are skewed in a clockwise direction, while the apertures 401 of pole pieces 203 and 206 are skewed in a counterclockwise direction. The barriers 401 include side walls that are not necessarily parallel to one another, as illustrated in FIG. 4. However, FIG. 5 illustrates a construction in which at least some of the side walls are substantially parallel to one another within each pole piece 201, 203, 204, 206. The short pole pieces 202 and 205 include a single flux barrier 410 that is positioned in about the center of the pole piece between the permanent magnet slots 212, 215 and the outer surface 405 of the lamination 400.

Figure 6:
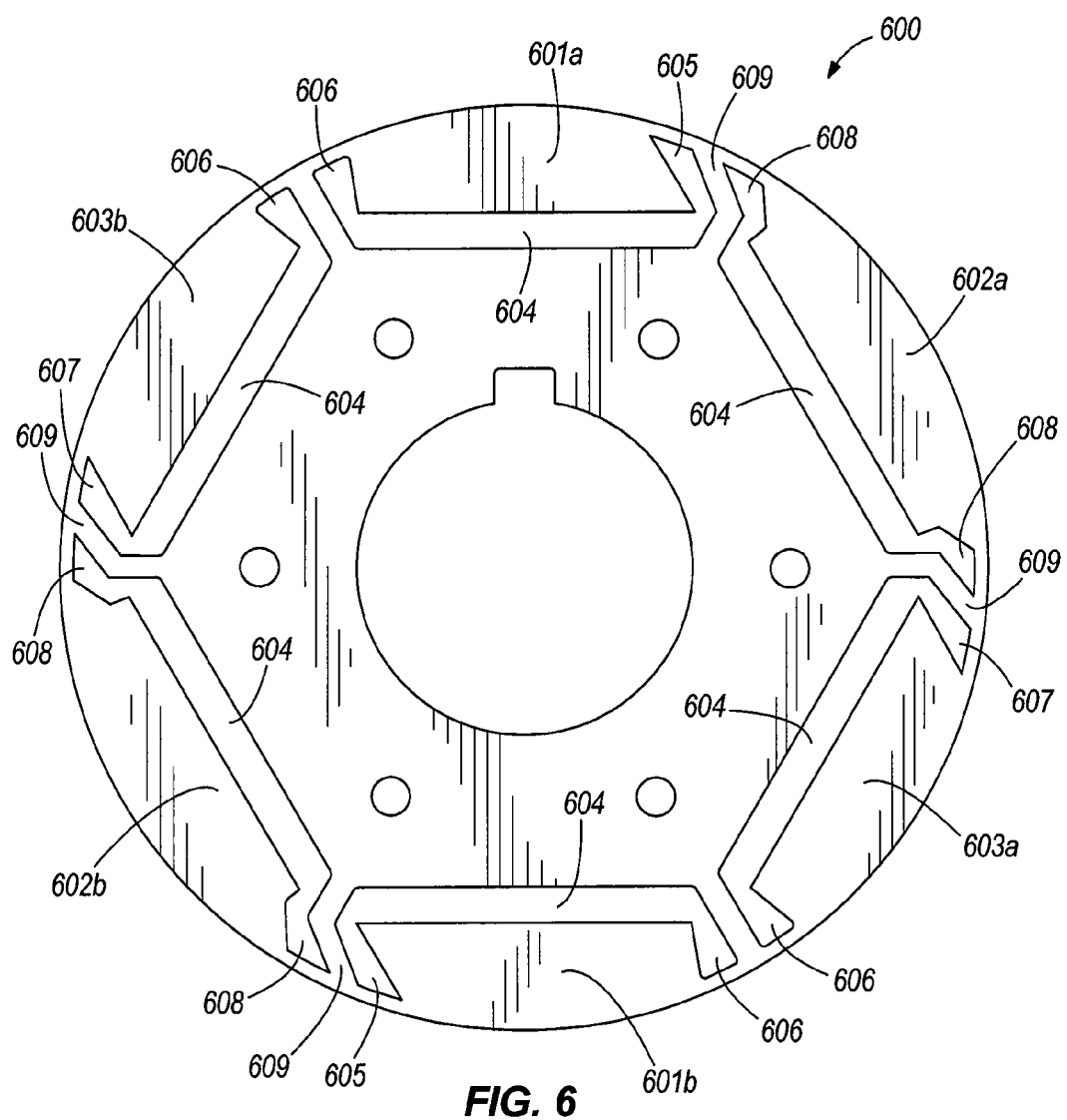
FIG. 6 is an end view of another rotor core of the IPM (interior permanent magnet) type with unequal poles and flux barriers.

FIG. 6 illustrates another embodiment of a core 600 that includes one pair of long pole pieces 602a and 602b and two pairs of short pole pieces 601a and 601b, and 603a and 603b, respectively. Geometric morphism can be applied to derive the geometry of the core 600 from the core 101 of FIG. 1 through a similar procedure as the one described with reference to FIG. 2 by "skewing" as required the permanent magnet slot end regions. Specifically, the short pole pieces 601a and 601b include a magnet slot 604 and a first end portion 606 that are similar to those of the construction of FIG. 1. The second end portion 605 is skewed in a counterclockwise direction toward the center of the pole piece, thereby shortening the arc length of the pole piece when compared to the construction of FIG. 1. The short pole pieces 603a and 603b each include a permanent magnet slot 604 and a first end portion 606 similar to those illustrated in the construction of FIG. 1. The second end portion 607 is skewed in a clockwise direction toward the center of the respective pole piece to shorten the pole arc length.

The long pole pieces 602a and 602b each include a permanent magnet slot 604 and two end portions 608 that are skewed outward to extend the arc length of the long pole pieces 602a, 602b. The shape of each of the end portions 608 is modified when compared to the end portions of FIG. 1 such that the outer most walls of each end portion 608 are substantially parallel to the outermost walls of the adjacent end portion 605, 607. As such, the two adjacent end portions 608, 605, 607 cooperate to define a bridge 609 having a substantially uniform width.

Depending on the electromagnetic loading of the motor design, the geometry of FIG. 6 may be advantageous in reducing the local magnetic saturation in the pole pieces. In FIG. 6 the permanent magnet slot ends 605, 606, 607, 608 are shown as being continuous with the portion of the slot 604 in which the magnet is located. Alternative arrangements, in which some or all of the slot end portions 605, 606, 607, 608 are replaced by a combination of magnetic bridges and apertures, as shown for example on pole 202 in FIG. 2 are also possible.

Figure 7:
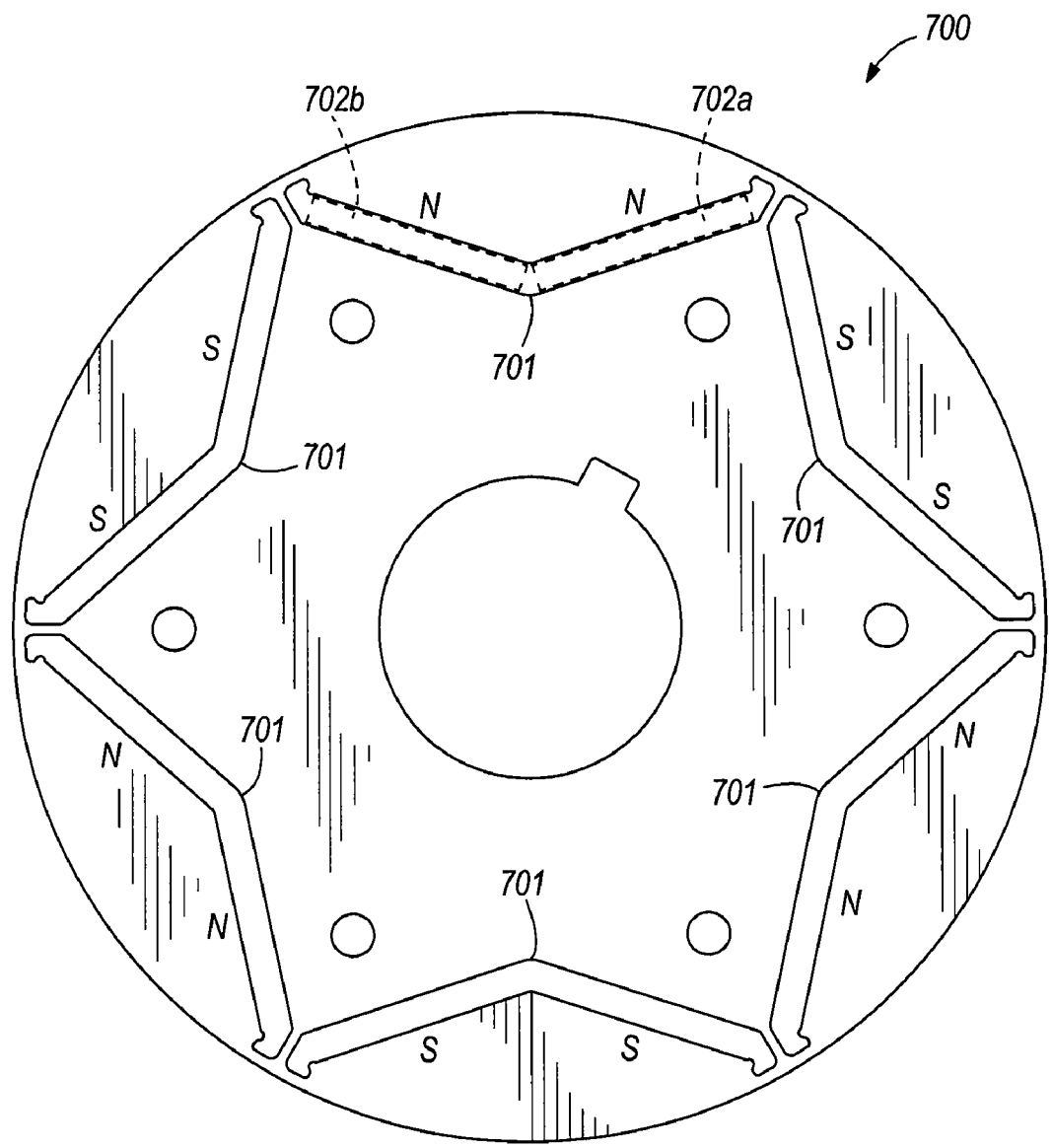
FIG. 7 is an end view of a rotor core of the IPM (interior permanent magnet) type with V-slots for permanent magnets.

FIG. 7 shows the cross section of another type of interior permanent magnet rotor core 700 that includes permanent magnet slots 701 that are substantially V-shaped. To define a six pole rotor each permanent magnet slot 701 receives two permanent magnets 702a, 702b with the polarity as marked in FIG. 7. The core 800 shown in FIG. 8 has similar pole pieces 801 with deeper V-shaped slots 805 and substantially larger permanent magnet slot ends 806 when compared to those of FIG. 7. The adjacent end portions 806 cooperate to define a narrow inter-polar bridge 807 between any two adjacent pole pieces. One of the advantages of this construction is that the central upper part of the pole piece (in between the magnet slots and rotor outer surface) is substantially larger and therefore the saturation of the armature reaction q-axis flux-path is reduced and the motor output performance is enhanced.

Figure 9:
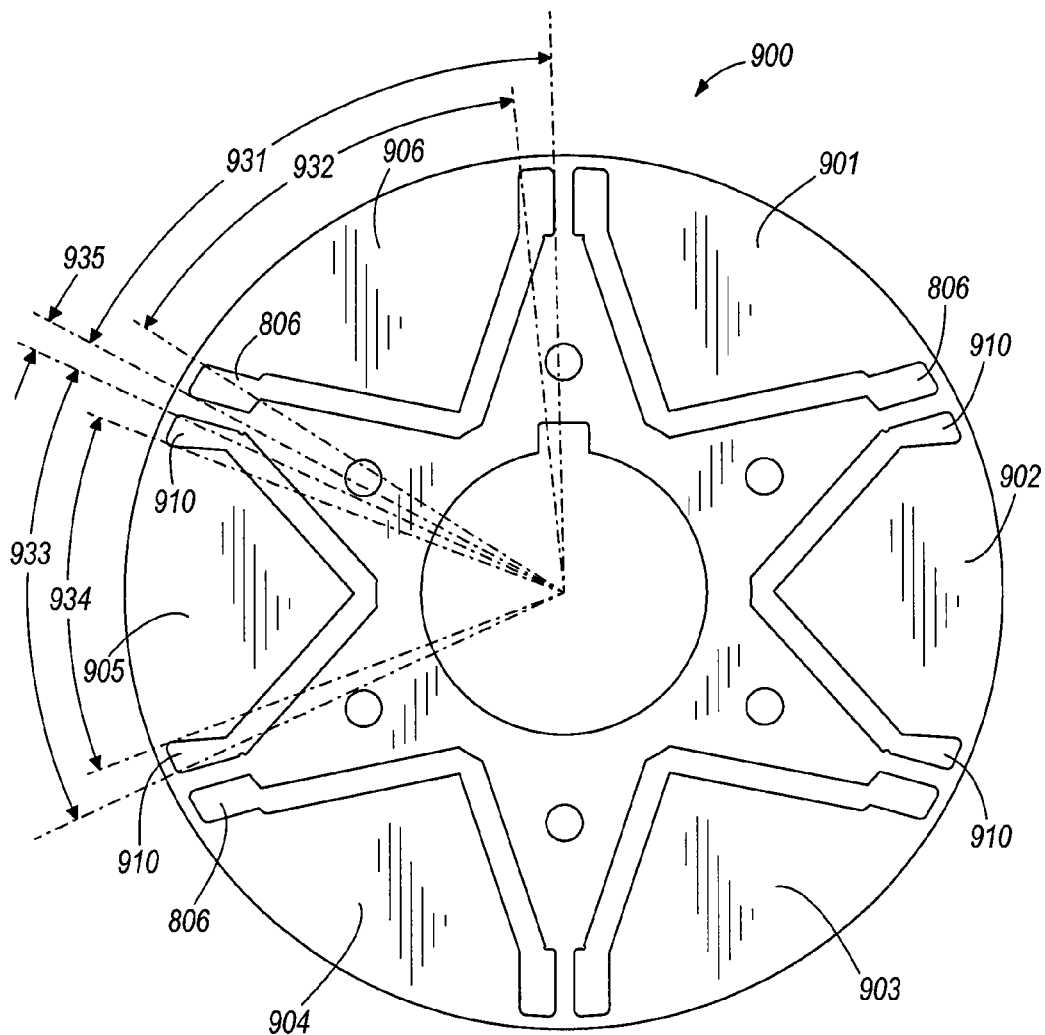
FIG. 9 is an end view of another rotor core of the IPM-type with unequal poles.

The core 900 shown in FIG. 9 has four equal-length long pole pieces 901, 903, 904, and 906 and two short pole pieces 902, 905. The long pole pieces 901, 903, 904, and 906 include substantially rectangular end portions 806, while the short pole pieces include smaller end portions 910 that are more triangular and are skewed inward to reduce the size of the pole pieces 902, 905. Each pole piece defines radial lines 111 and 112 as described with regard to FIGS. 1 and 2. Additionally, arcs 931, 932, 933, 934, and 935 are defined between lines 111 and 112 of the various pole pieces as was described with regard to FIGS. 1 and 2.

Figure 10:
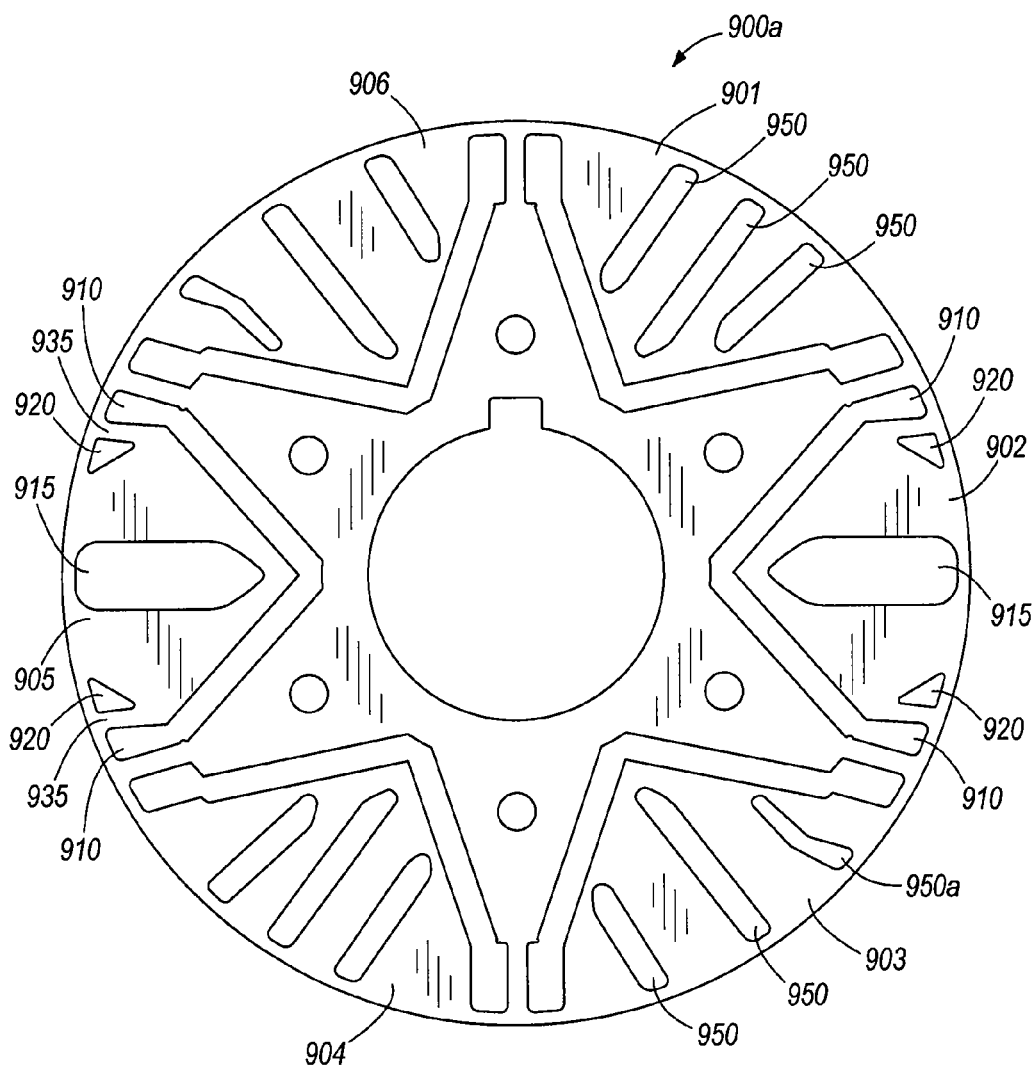
FIG. 10 is an end view of another rotor core of the IPM-type with unequal poles and flux barriers.

The core 900a of FIG. 10 combines the unequal pole piece concept of FIG. 9 with the use of asymmetric flux barriers to further enhance motor performance. The long pole pieces 901, 903, 904, and 906 each include three flux barriers 950 of differing lengths and arrangements. The flux barriers 950 of poles 901 and 904 include substantially straight sidewalls that are not necessarily parallel to one another. The flux barriers 950 of poles 903 and 906 include two barriers 950 with substantially straight sidewalls and one barrier 950*a* that include an elbow that slightly skews the most outward end of the barrier 950*a*.

The short pole pieces 902 and 905 include a single large flux barrier 915 and two small apertures 920. The large apertures 915 are substantially elongated and cross a radial line that passes through the center of the short pole pieces 902, 905. The small barriers 920 are positioned near the end portions 910 and are substantially triangular such that they cooperate with the adjacent end portions 910 to define a narrow bridge 935 therebetween.

In one construction of a 3-phase, 6-pole motor equipped with the rotor core 900 of FIG. 9 and with a stator having 36 slots and a distributed equivalent lap winding with a short pitch of 5 slots, optimal on-load performance can be obtained for an active pole length of approximately 55.5 degrees for pole pieces 901, 903, 904, and 906 and of approximately 46 degrees for pole pieces 902 and 905. More specifically, the values for the arcs 931, 932, 933, 934 and 935, were approximately 60.6, 51.1, 50.6, 41.1, and 2.7 degrees, respectively. Based on these values, the average active pole length is equal to 52.3 mechanical degrees. More generally, the preferred range for the average active pole length is 125 to 165 electric degrees.

Figure 8:
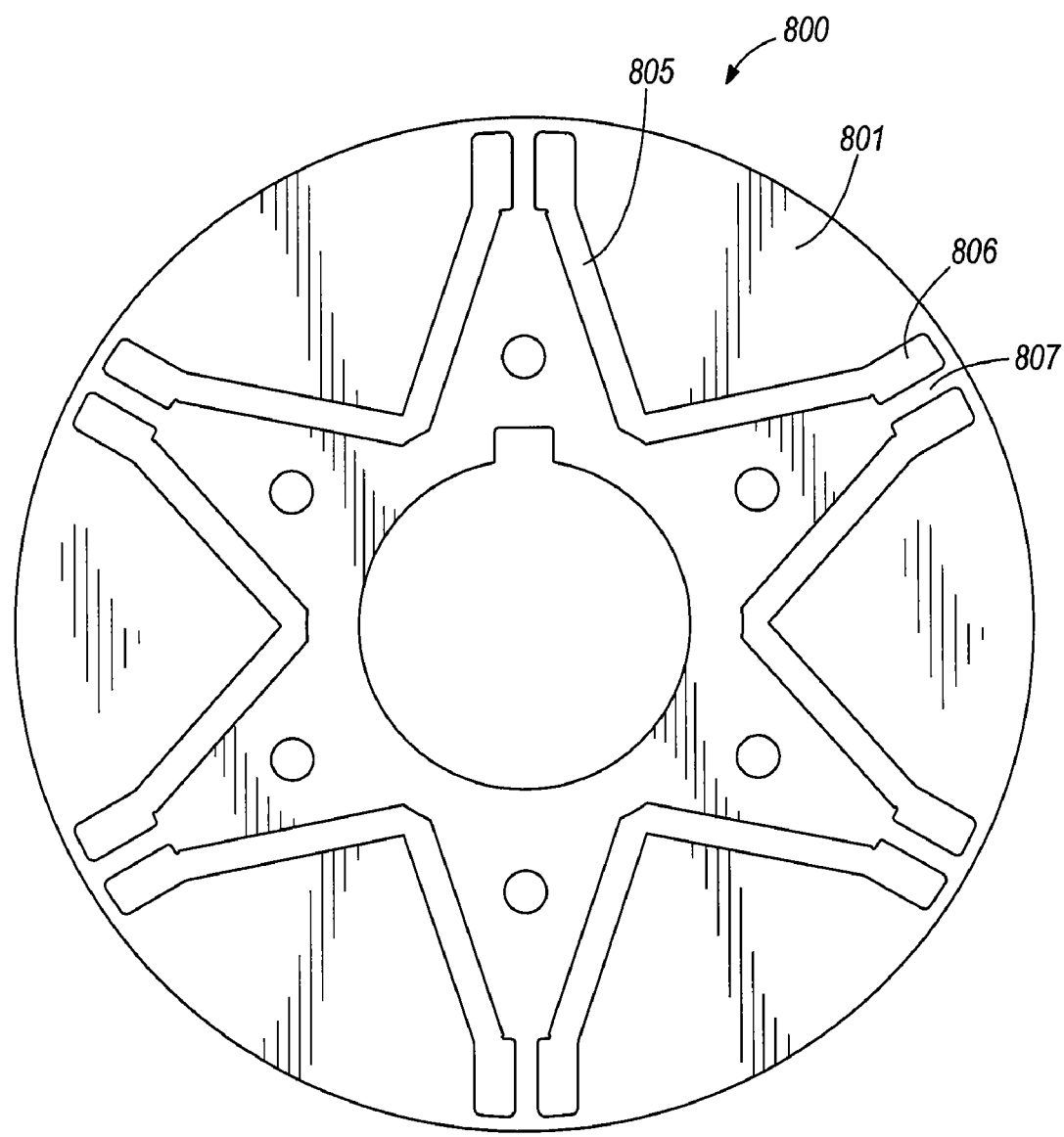
FIG. 8 is an end view of another rotor core of the IPM-type with deep V-slots for permanent magnets.
Figure 11:
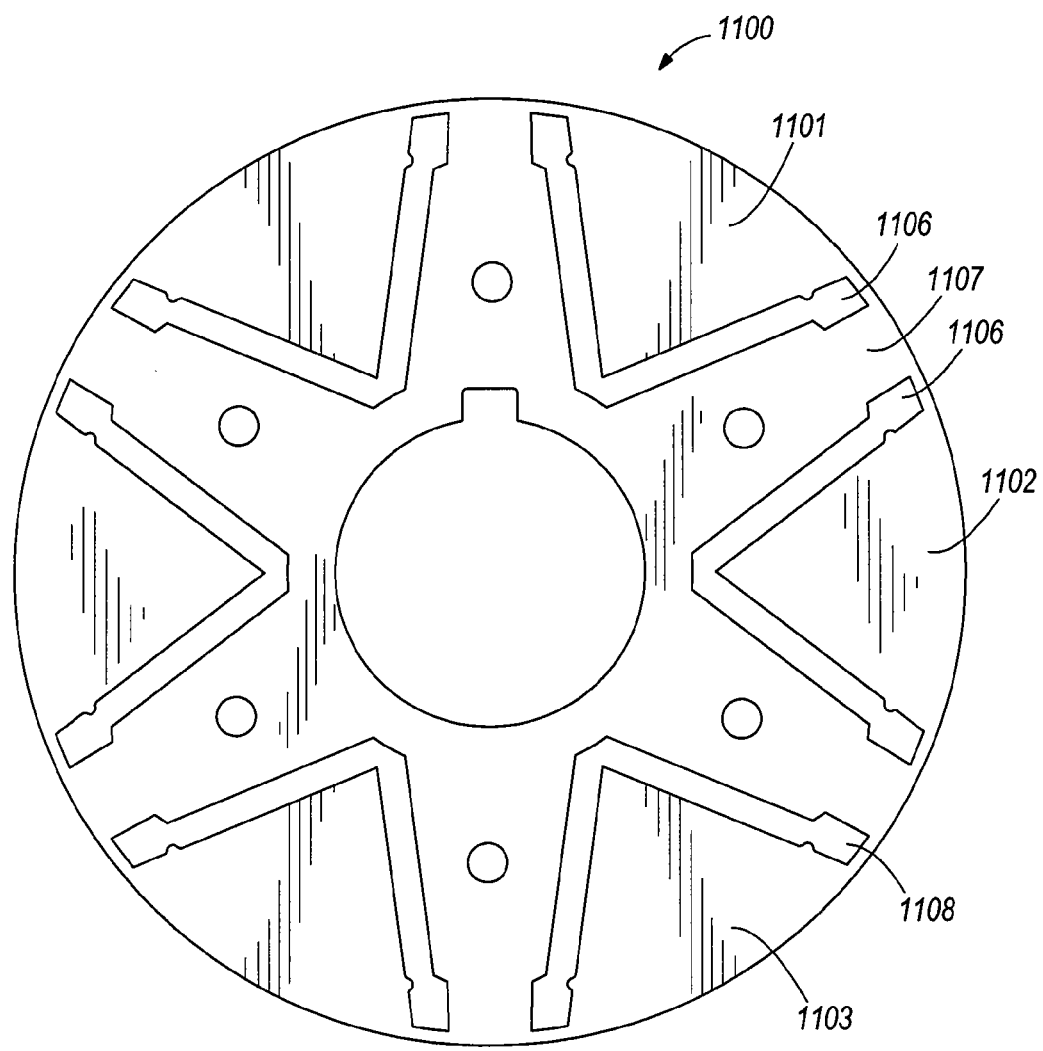
FIG. 11 is an end view of another rotor core of the IPM-type with deep V-slots similar to those of FIG. 8 but with a smaller active pole length.

In the construction illustrated in FIG. 8, the inter-polar bridges 807 are substantially thin. FIG. 11 illustrates another construction that is similar to the construction of FIG. 8 with the exception that the inter-polar bridges 1107 defined by adjacent permanent magnet slot end portions 1106 are substantially larger than the bridges 807 of FIG. 8, thereby producing an active pole length, which is approximately 45 degrees in this case, that is substantially smaller than the 60 degree pole length. The size of the active pole length can be changed by modifying the width of the inter-polar bridges 1107 and/or the width of the permanent magnet slot ends 1106. The size of the active pole length influences the harmonic content of the magnetic field in the motor air-gap and magnetic circuit.

Figure 12:
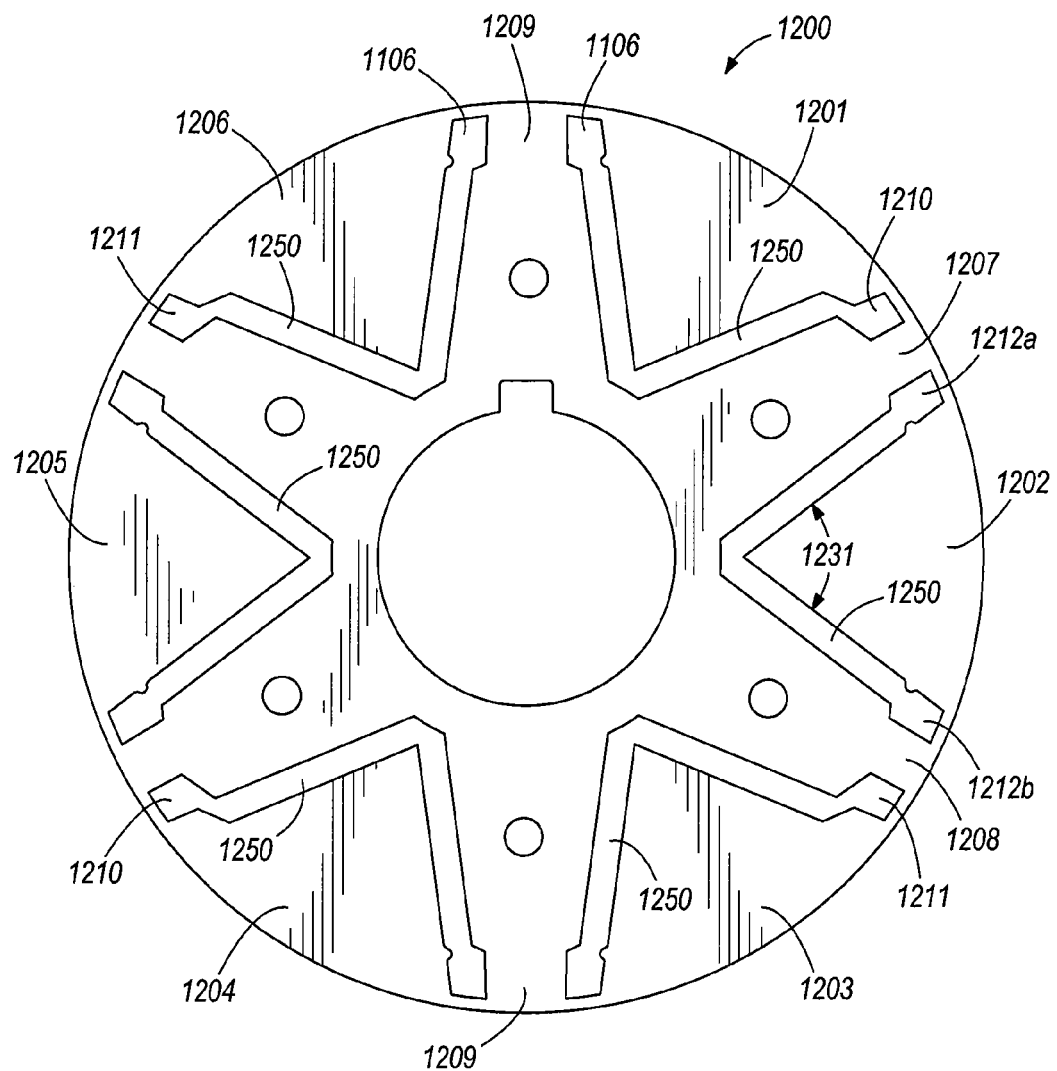
FIG. 12 is an end view of another rotor core of the IPM-type similar to the rotor of lamination of FIG. 11 with poles of unequal active length.

The rotor core 1200 of FIG. 12 is similar to the core 1100 of FIG. 11, but includes four long pole pieces and two short pole pieces. Pole pieces 1201 and 1204 include a magnet slot 1250 and end portion 1106 similar to those of FIG. 11. However, the second end portion 1210 is skewed in the clockwise direction to produce two long pole pieces. Pole pieces 1203 and 1206 include a magnet slot 1250 and end portion 1106 similar to those of FIG. 11. However, the second end portion 1211 is skewed in the counterclockwise direction away from the center of the pole piece to produce two long pole pieces. The remaining pole pieces 1202 and 1205 are similar to the pole pieces 1101-1106 of FIG. 11.

The end portions 1210, 1211 are skewed by the same optimally selected skew angle. All other elements, including the body portion of the permanent magnet slots 1250 and the entire geometry of pole pieces 1202, 1205 are substantially the same as those of FIG. 11. Consequently, the inter-polar bridges 1207 and 1208 are thinner than the inter-polar bridges 1209, which are positioned at 12 and 6 o'clock. Both the active arc and the overall length of the pole pieces 1201, 1203 are increased. The active length of the pole piece 1202 remains unchanged and the pole length of the pole piece 1202 is reduced by twice the angular (arc) value by which each of the pole pieces 1201 and 1203 have increased. In the example design shown in FIG. 12, pole pieces 1201 and 1203 have the same active length of approximately 48.33 degrees, while pole piece 1202 has an active length substantially equal to 45 degrees. The arc for the bridge 1209 is approximately 10.4 degrees and for the bridges 1207 and 1208 approximately 7 degrees.

Combinations between the various concepts and features disclosed are also possible. For example, with reference to FIG. 12, another embodiment can be derived by also skewing the permanent magnet slot ends 1212*a* and 1212*b* in the pole piece 1202 by about 3.33 degrees. As a result, all the bridges will be equal and the active pole length of the pole piece 1202 is reduced by about 6.67 degrees from about 45 degrees to about 38.33 degrees. In this example rotor, the average active pole length would be about 45 degrees.

In other constructions, the angle 1231 of only some of the V-shaped permanent magnet slots 1250 can be changed. Although this may result in an axial misalignment of the permanent magnet slots 1250 in a modular structure as the one shown in FIG. 3, the design may be beneficial in reducing the harmonic content of the motor magnetic field.

The innovative concepts described can be directly extended to motors and rotor shaving a polarity that is an integral multiple of six (e.g. 12-pole), and, on a more general basis, to other polarities, which are within the scope of the invention.

Figure 19:
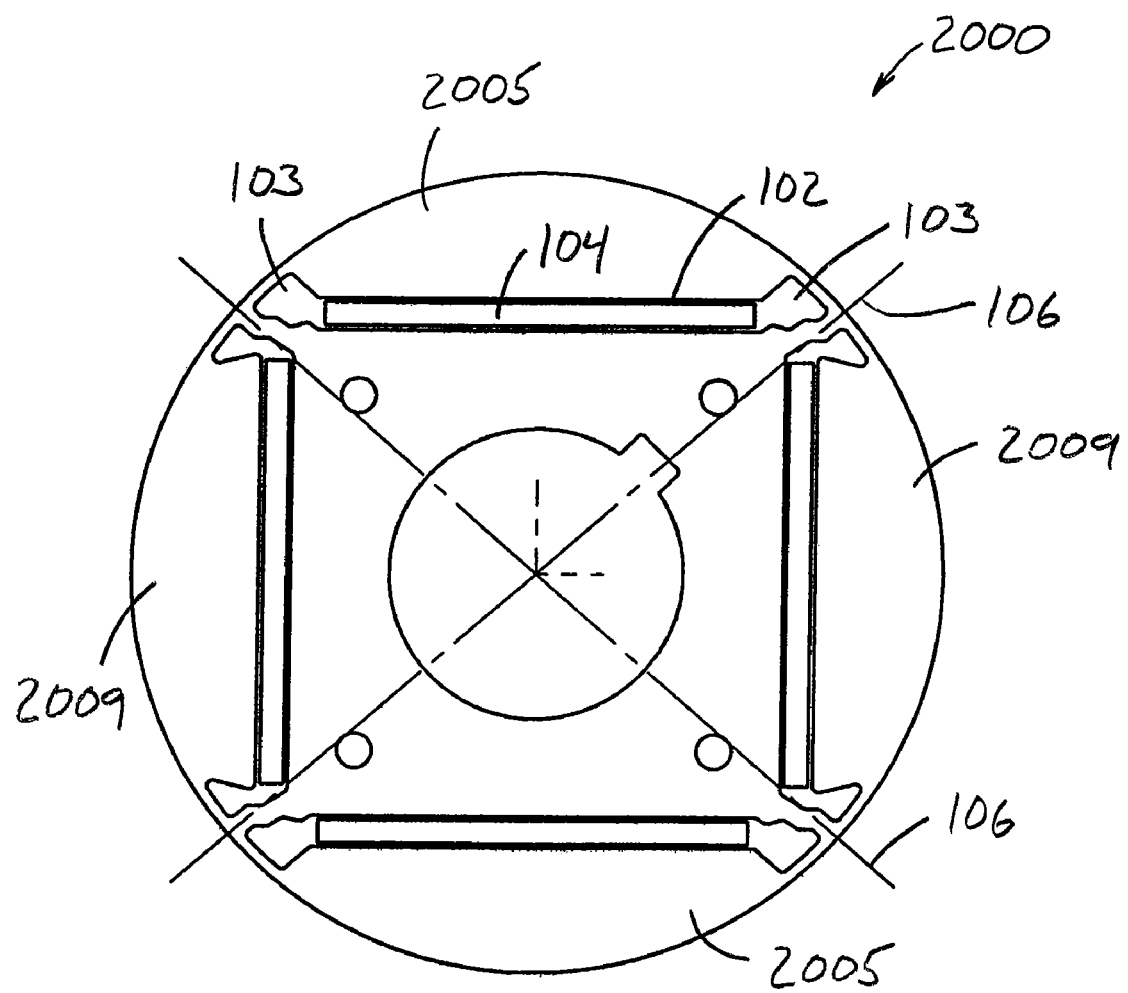
FIG. 19 is an end view of another rotor core of the IPM type with four unequal poles.

A 4-pole example rotor core 2000 is shown in FIG. 19. Two of the poles 2005 are wider than the other two poles 2009 by an angle, which is optimally selected such as to improve the harmonic content of the flux density and enhance motor operation. The structure has a 180 degree symmetry that reduces the effect of radial forces. The sum of the pole arc for two adjacent poles is equal to 180 mechanical degrees. In the 6-pole rotor constructions previously the sum of the pole arc for three adjacent poles is equal to 180 mechanical degrees. The design principle of FIG. 19 can be extended to any rotor topologies that have a polarity that is an integral multiple of four.

The variation, on a per pole basis of the values of the magnetic pole arc or length and the active pole arc or length affect the harmonic content of the motor magnetic field. This allows improvements in motor performance that otherwise would require a relative axial skew of the stator and rotor. Hence the invention is also beneficial in improving the manufacturability of electric machines.

FIGS. 14 through 18 illustrate specific constructions of the various embodiments illustrated herein. It should be noted that these specific constructions are but one possible arrangement with other arrangements being possible and in some applications, possibly advantageous over those illustrated herein.

Figure 14:
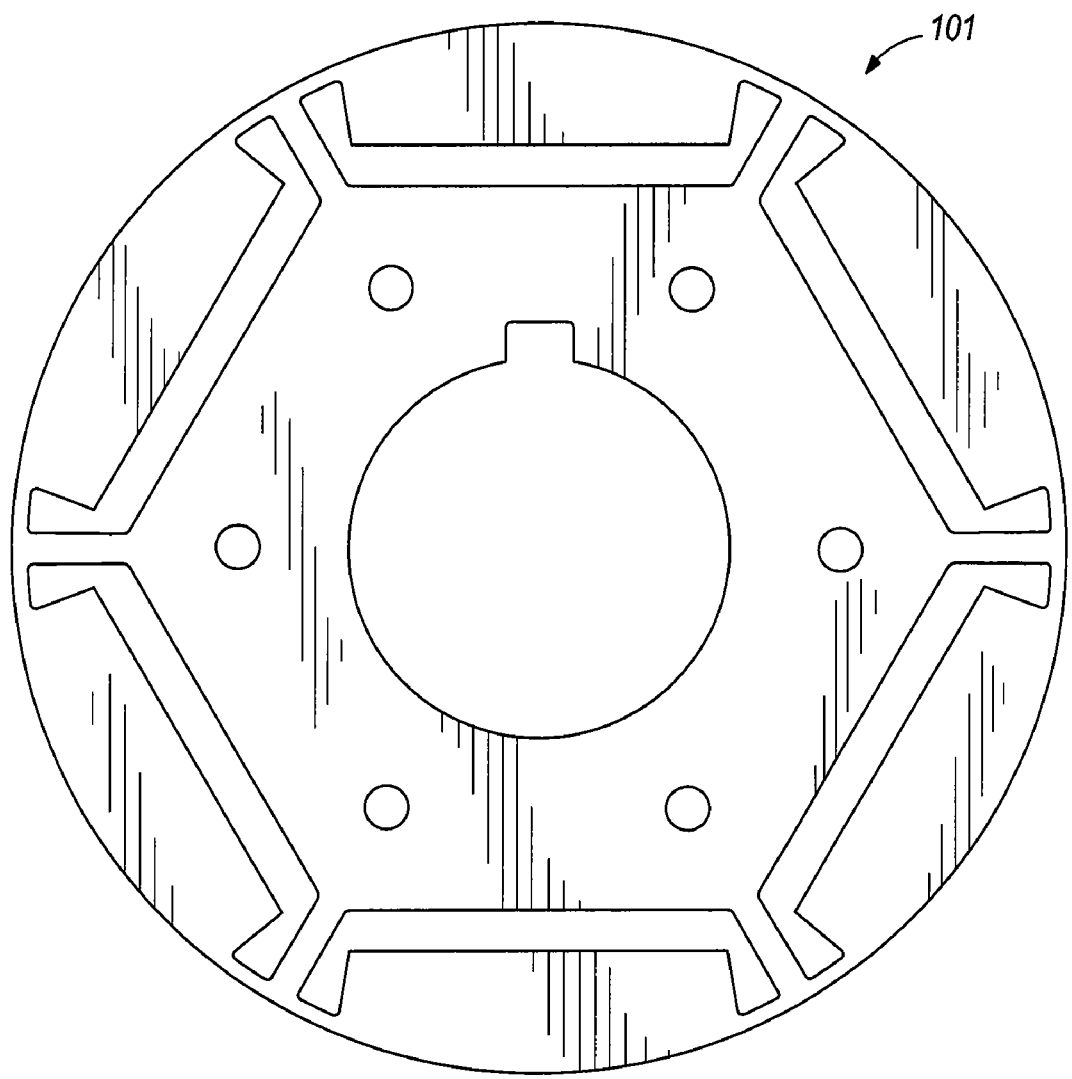
FIG. 14 is an end view of the rotor core of FIG. 1 including angles for one possible construction.
Figure 15:
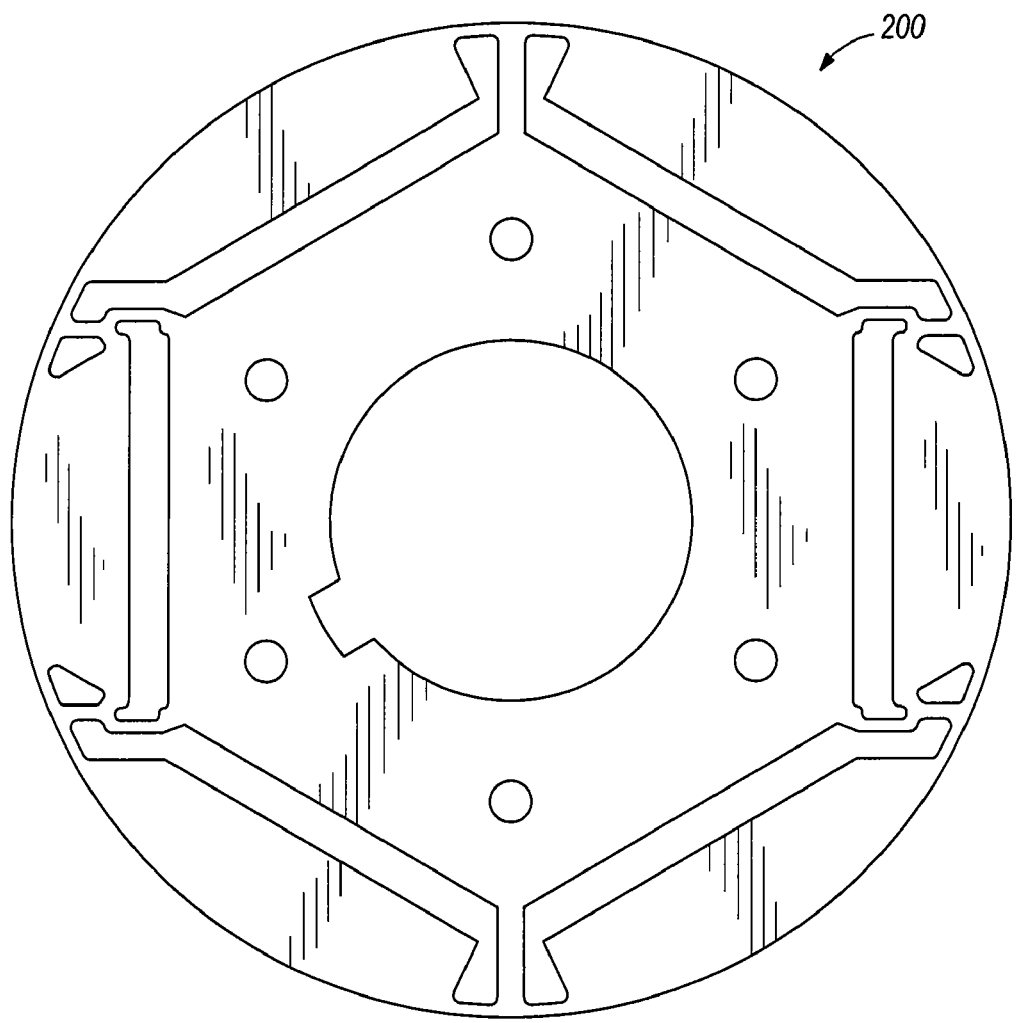
FIG. 15 is an end view of the rotor core of FIG. 2 including angles for one possible construction.
Figure 16:
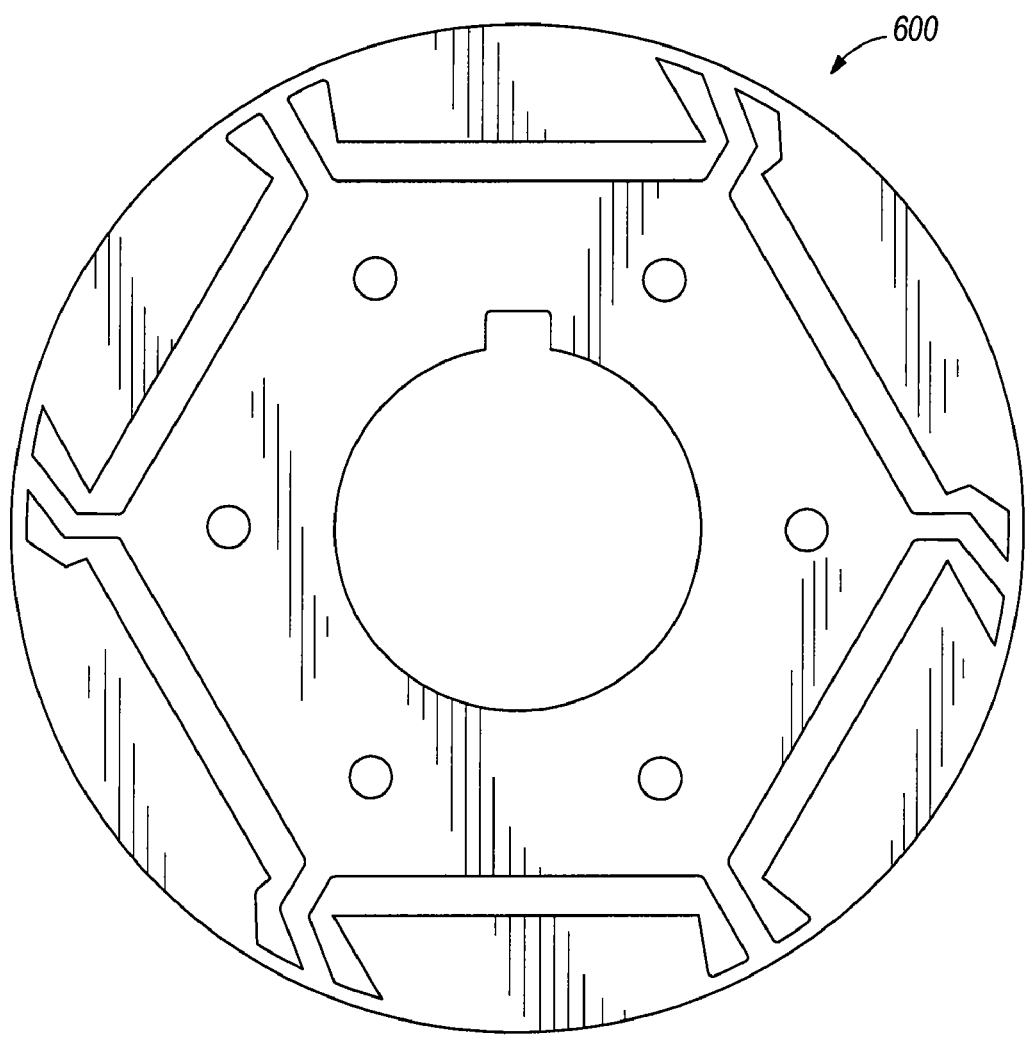
FIG. 16 is an end view of the rotor core of FIG. 6 including angles for one possible construction.
Figure 17:
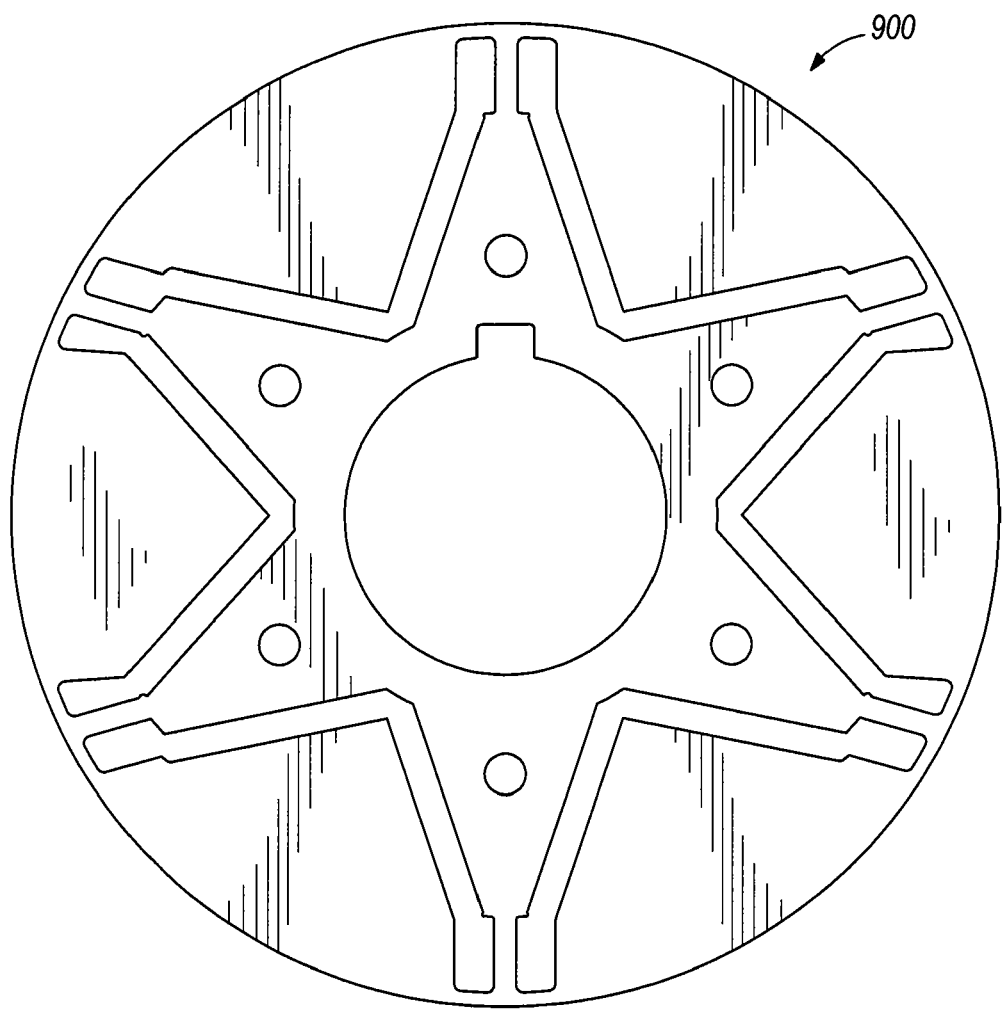
FIG. 17 is an end view of the rotor core of FIG. 9 including angles for one possible construction.
Figure 18:
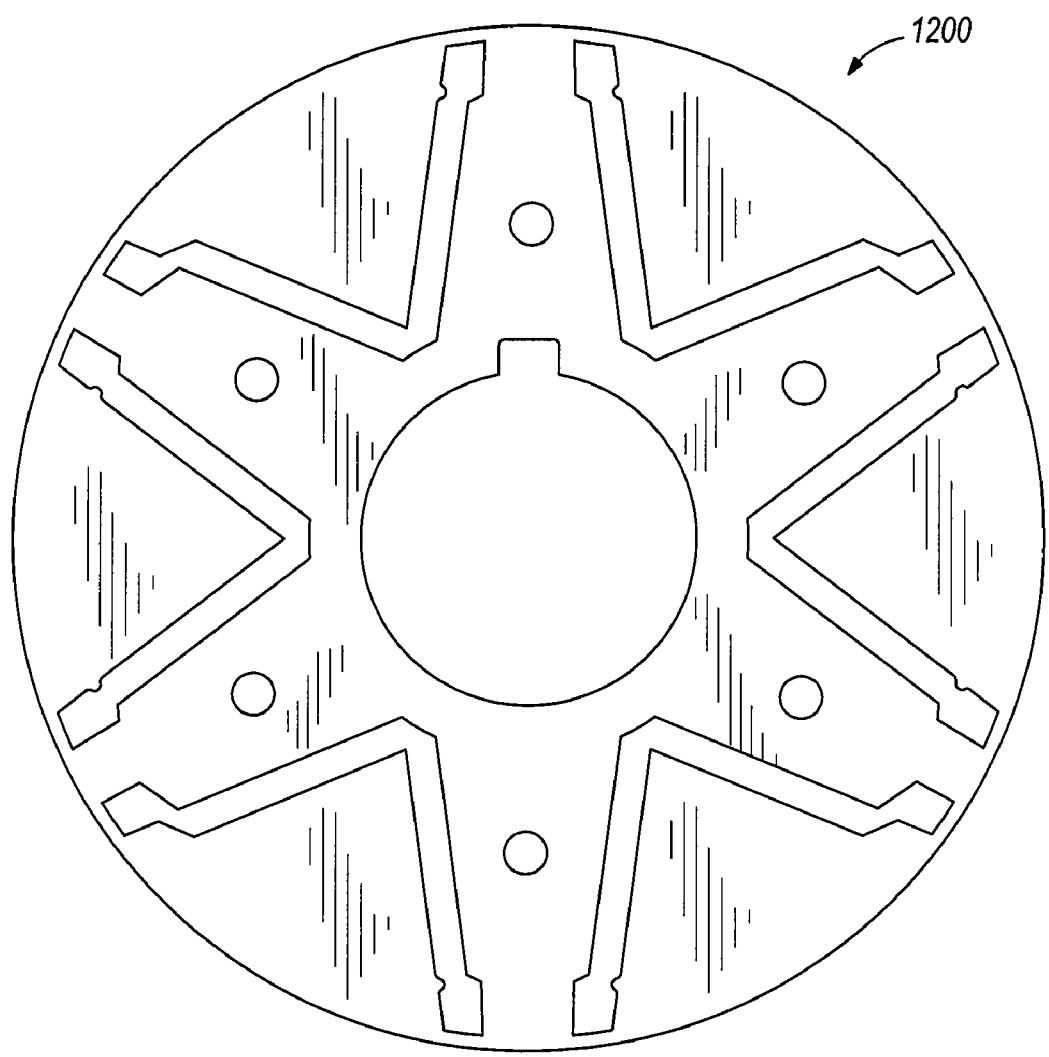
FIG. 18 is an end view of the rotor core of FIG. 12 including angles for one possible construction.

FIG. 14 illustrates a specific construction of the embodiment of FIG. 1. FIG. 15 illustrates a specific construction of the embodiment of FIG. 2. FIG. 16 illustrates a specific construction of the embodiment of FIG. 6. FIG. 17 illustrates a specific construction of the embodiment of FIG. 9. FIG. 18 illustrates a specific construction of the embodiment of FIG. 12.

It should be noted that the term stackwise direction 33 is used herein to describe the direction in which a rotor core grows as additional laminations are stacked thereon. As such, the stackwise direction 33 generally extends along the axis of rotation or the central axis of the shaft 130 on which the laminations are attached.

The term pole or pole portion is used to define the substantially pie-shaped portions of the laminations or rotors that include one complete magnet slot. The pole portions may be geometrically similar and may include some asymmetry or may be different all together. In addition, the number of pole portions is not indicative of the number of magnetic poles defined by the rotor as more magnetic poles can be provided by including multiple magnets of differing polarity in each pole or pole portion. Alternatively, multiple poles or pole portions can include magnets of the same polarity, thereby effectively combining them into magnetic poles such that the resulting rotor has fewer or more magnetic poles than pole portions or poles.

The invention was described with reference to rotor laminations. It is understood that the concepts are generally applicable to other rotor components, such as axial modules made of another type of ferromagnetic material such as compacted powder steel or soft magnetic composites. The invention was described with reference to rotors that are interior to the stator. It is understood that the concepts are generally applicable also to motors having the rotor exterior to the stator, a construction typically described as an inside-out design.

It should be noted that some laminations could be arranged to include features illustrated in various figures herein but not illustrated together. Thus, a number of other arrangements are possible based on various combinations of the features described herein.

Thus, the invention provides, among other things, a new and useful rotor for use in a motor. The rotor includes internally-mounted magnets and can be used, among other things, to replace a motor with permanent magnets mounted on the rotor surface and to enhance motor performance.

What is claimed is:

1. An electric machine comprising:
   a stator;
   a rotor core including a first rotor portion positioned adjacent the stator and having an outside diameter, the first rotor portion including a plurality of elongated slots that define a plurality of poles, the plurality of poles defining a plurality of pole pairs, each pair including two poles in which one pole is positioned opposite the other of the two poles; and
   a plurality of magnets, each of the plurality of magnets positioned within one of the slots and arranged such that each of the plurality of poles has a magnetic arc length that is different than a magnetic arc length of any adjacent pole, wherein each pole in any one of the plurality of pole pairs is substantially identical to the other pole of the selected pole pair, and wherein at least one of the slots includes two opposite ends that are different from one another.

2. The electric machine of claim 1, wherein the first rotor portion defines a rotational axis and wherein the first rotor portion is symmetric about any inter-polar axis that passes through the rotational axis and is normal to the rotational axis.

3. The electric machine of claim 1, wherein the total number of poles in the plurality of poles is an integral multiple of four.

4. The electric machine of claim 3, wherein the sum of the magnetic arc lengths of any two adjacent poles is about equal to 360 electrical degrees.

5. The electric machine of claim 1, wherein the total number of poles in the plurality of poles is an integral multiple of six.

6. The electric machine of claim 5, wherein the sum of the magnetic arc lengths of any three adjacent poles is about equal to 540 electrical degrees.

7. The electric machine of claim 1, wherein each pole defines an active pole arc length that is between about 125 electrical degrees and 165 electrical degrees.

8. The electric machine of claim 1, wherein the first rotor portion is formed from a plurality of laminations stacked in an axial direction.

9. The electric machine of claim 1, wherein the rotor core includes a second rotor portion that is substantially the same as the first rotor portion, the second rotor portion positioned adjacent the first rotor portion.

10. The electric machine of claim 9, wherein the first rotor portion includes four slots and wherein the second rotor portion is rotated about 90 degrees with respect to the first rotor portion such that at least one slot of the first rotor portion is adjacent a slot of the second rotor portion that has a different shape.

11. The electric machine of claim 9, wherein the rotor core includes a third rotor portion that is substantially the same as the second rotor portion, the third rotor portion positioned adjacent the second rotor portion.

12. The electric machine of claim 11, wherein the first rotor portion includes six slots and wherein the second rotor portion is rotated about 60 degrees with respect to the first rotor portion and the third rotor portion is rotated about 120 degrees with respect to the first rotor portion such that at least one slot of the first rotor portion is adjacent a slot of the second rotor portion that has a different shape, and at least one slot of the second rotor portion is adjacent a slot of the third rotor portion that has a different shape.

13. An electric machine comprising:
    a stator;
    a first rotor portion positioned adjacent the stator and having an outside diameter, the first rotor portion including a first number of slots formed proximate the outside diameter to define a first number of pole pieces, each slot including a first end region and a second end region that cooperates with the respective slot to define a pole pitch, the pole pitch of any one of the pole pieces being different from the pole pitch of at least one pole piece adjacent the one selected pole piece, the pole pitch of the selected pole piece being substantially identical to the pole pitch of a pole piece opposite the selected pole piece;
    a second rotor portion substantially the same as the first rotor portion and including a first number of pole pieces, the second rotor portion stacked axially adjacent the first rotor portion such that at least one of the pole pieces of the second rotor portion has a different pole pitch than the adjacent pole piece of the first rotor portion; and
    a plurality of magnets, each magnet positioned within one of the slots.

14. The electric machine of claim 13, wherein each slot is at least partially defined by two substantially parallel linear edges.

15. The electric machine of claim 13, wherein the first rotor portion is formed from a first plurality of laminations stacked in an axial direction.

16. The electric machine of claim 15, wherein the second rotor portion is formed from a second plurality of laminations that are the same as the first plurality of laminations.

17. The electric machine of claim 13, wherein the first rotor portion includes four pole pieces and wherein the second rotor portion is rotated about 90 degrees with respect to the first rotor portion.

18. The electric machine of claim 13, further comprising a third rotor portion that is substantially the same as the second rotor portion, the third rotor portion positioned adjacent the second rotor portion.

19. The electric machine of claim 18, wherein the first rotor portion includes six pole pieces and wherein the second rotor portion is rotated about 60 degrees with respect to the first rotor portion and the third rotor portion is rotated about 120 degrees with respect to the first rotor portion such that at least one of the pole pieces of the second rotor portion has a different pole pitch than the adjacent pole piece of the third rotor portion.

20. The electric machine of claim 13, wherein the first rotor portion defines a plurality of flux barriers and wherein at least one flux barrier is positioned between each one of the slots and the outside diameter.

21. The electric machine of claim 20, wherein a portion of the plurality of flux barriers are elongated openings that each define a longitudinal axis that is skewed with respect to any radial line that intersects the opening.

* * * * *